US012630006B2

(12) United States Patent
Lambert et al.

(10) Patent No.: US 12,630,006 B2
(45) Date of Patent: May 19, 2026

(54) SELF-POWERED ALL-TERRAIN WHEEL

(71) Applicant: Asian Prime Sources Limited

(72) Inventors: Jonathan Andrew George Lambert, Auckland (NZ); Michael John Cann, Auckland (NZ)

(73) Assignee: Asian Prime Sources Limited, Hong Kong (CN)

( * ) Notice: Subject to any disclaimer, the term of this patent is extended or adjusted under 35 U.S.C. 154(b) by 321 days.

(21) Appl. No.: 18/461,789

(22) Filed: Sep. 6, 2023

(65) Prior Publication Data

US 2024/0083240 A1     Mar. 14, 2024

Related U.S. Application Data

(60) Provisional application No. 63/404,557, filed on Sep. 8, 2022.

(51) Int. Cl.
*B60K 7/00*          (2006.01)
*B60T 13/74*          (2006.01)

(52) U.S. Cl.
CPC .......... B60K 7/0007 (2013.01); B60T 13/748 (2013.01)

(58) Field of Classification Search
CPC ............................ B60K 7/0007; B60T 13/748
USPC ....................................................... 180/65.51
See application file for complete search history.

(56) References Cited

U.S. PATENT DOCUMENTS

| | | |
|---|---|---|
| 1,876,068 A | 9/1932 | Musselman |
| 2,113,031 A | 4/1938 | Merz et al. |
| 2,697,010 A | 12/1954 | Hirschmugl |
| 2,878,071 A | 3/1959 | Fowlkes |
| D418,890 S | 1/2000 | Wilson |
| D489,110 S | 4/2004 | Carlson |
| D717,383 S | 11/2014 | Nay |

(Continued)

FOREIGN PATENT DOCUMENTS

| | | |
|---|---|---|
| CN | 102673380 A | 9/2012 |
| CN | 103 821 855 A | 5/2014 |

(Continued)

OTHER PUBLICATIONS

Feb. 12, 2025 Extended European Search Report issued in European Application No. 24198976.3; 5 pp.

(Continued)

*Primary Examiner* — Hau V Phan
(74) *Attorney, Agent, or Firm* — Nelson Mullins Riley & Scarborough LLP

(57)          ABSTRACT

A motorized wheel assembly is provided herein. The motorized wheel assembly comprises an in-hub motor comprising a stator and a rotor. A shaft is connected to the stator of the in-hub motor. The motorized wheel assembly further comprises a hub, attached to and configured to rotate with the rotor. The hub is disposed about the shaft and the in-hub brake system. The wheel assembly further includes a tire disposed about the hub. The motorized wheel assembly further comprise an in-hub brake system positioned about the shaft. The in-hub brake system comprises a biasing system, an actuator plate, a brake plate, and a brake pad system. The biasing system is configured to bias the actuator plate to the engaged position to cause the brake pad system to apply a force to the brake plate to prevent rotation of the hub and the tire.

20 Claims, 30 Drawing Sheets

(56)  References Cited

U.S. PATENT DOCUMENTS

| | | | |
|---|---|---|---|
| D757,873 S | 5/2016 | Nay | |
| D785,739 S | 5/2017 | Nay | |
| 10,046,824 B2 | 8/2018 | Zhang et al. | |
| 10,756,582 B2 * | 8/2020 | Roberts ................. | H02K 15/14 |
| D917,361 S | 4/2021 | Lin et al. | |
| D919,011 S | 5/2021 | Fan et al. | |
| 11,251,737 B2 * | 2/2022 | Burke .................... | H02K 21/22 |
| 2017/0110933 A1 | 4/2017 | Michel | |
| 2018/0045255 A1 | 2/2018 | Chelaidite et al. | |
| 2019/0040921 A1 | 2/2019 | Zhao et al. | |
| 2020/0373806 A1 | 11/2020 | Nam et al. | |
| 2021/0031615 A1 * | 2/2021 | Li ........................... | B60T 1/062 |
| 2021/0094405 A1 * | 4/2021 | Payne ..................... | B60K 6/52 |
| 2021/0094425 A1 * | 4/2021 | Payne ..................... | B60L 50/60 |
| 2021/0194302 A1 | 6/2021 | Purchase et al. | |
| 2021/0221218 A1 * | 7/2021 | Li ......................... | F16D 65/827 |
| 2022/0194233 A1 * | 6/2022 | Reuter ..................... | B60L 7/10 |
| 2024/0083240 A1 | 3/2024 | Lambert et al. | |

FOREIGN PATENT DOCUMENTS

| | | |
|---|---|---|
| CN | 111 987 845 A | 11/2020 |
| DE | 10 2019 117961 A1 | 1/2021 |
| WO | WO 93/15546 A1 | 8/1993 |
| WO | WO 2022/096084 A1 | 5/2022 |

OTHER PUBLICATIONS

Wheeleez™; retrieved Oct. 25, 2024 from https://wheeleez.com/.

Feb. 6, 2024 Search Report issued in European Application No. 23 19 5767.1.

* cited by examiner

SELF-POWERED ALL-TERRAIN WHEEL

CROSS-REFERENCE TO RELATED APPLICATION(S)

This application claims priority to U.S. Provisional Application No. 63/404,557, entitled "Self-Powered All-Terrain Wheel", filed Sep. 8, 2022; the contents of which is incorporated by reference herein in its entirety.

FIELD

Embodiments of the present invention relate generally to wheel assemblies and more particularly, to motorized wheel assemblies.

BACKGROUND

Wheel assemblies provide easier transportation of a device. Wheel assemblies are generally coextensive with the axle of the device and may comprise multiple components configured separate from one another. In many wheel assemblies the brake system and the motor system may be distinct. The method of attachment to the axle and the distinct components limit the ability of the wheel assembly from being waterproof, and thus, the devices utilizing the wheel assemblies may not useable in all conditions.

BRIEF SUMMARY

The present invention is directed to a motorized wheel assembly configured to contain various components (e.g., a motor and/or a brake system) within the wheel assembly. The in-hub components allow for the motorized wheel assembly to be interchangeable with freerolling wheels and/or be waterproofed to at least IPX6.

Various example embodiments of the motorized wheel assembly are configured for single side connection, thus allowing the substitution of free rolling wheels with the motorized wheel assembly. The motorized wheel assembly is configured to distribute the load generated from the single side mounted motor along the shaft.

Various example embodiments of the motorized wheel assembly are configured with an in-hub brake system. The in-hub brake system may rotate with the hub, and be biased to a neutral, braked position. In this regard, the initial rotation of the motor disengages the brake and allows the brake system to rotate with the hub until the motor is turned off.

Further, various example embodiments of the present invention provide for a waterproofed motorized wheel assembly. In this regard, the wheel assembly is able to traverse wetlands, in rainstorms, and even in shallow bodies of water without flooding the motor or causing internal components to corrode.

In some embodiments of the present invention, a motorized wheel assembly is provided. The motorized wheel assembly comprises an in-hub motor comprising a stator and a rotor. A shaft is connected to the stator of the in-hub motor. The motorized wheel assembly further comprises a hub, attached to and configured to rotate with the rotor. The hub is disposed about the shaft and the in-hub brake system. The wheel assembly further includes a tire disposed about the hub. The motorized wheel assembly further comprises an in-hub brake system. The in-hub brake system comprises a biasing system and an actuator plate in mechanical communication with the biasing system. The actuator plate is configured to at least partially move along or rotate relative to the shaft between a disengaged position and an engaged position. The brake system further includes a brake plate positioned about the shaft and spaced apart from the actuator plate. The brake system further includes a brake pad system in mechanical connection with the actuator plate. The biasing system is configured to bias the actuator plate to the engaged position to cause the brake pad system to apply a force to the brake plate to prevent rotation of the hub and the tire. In some embodiments, the actuation of the motor causes the biasing system to transition to a second position that removes the biasing force from the actuator plate, that itself is biased to the disengaged position where the brake pad system ceases applying the force to the brake plate—thereby allowing the hub and tire to rotate.

Additional example embodiments of the present invention are provided herein.

In an example embodiment, a motorized wheel assembly is provided. The motorized wheel assembly comprises an in-hub motor comprising a stator and a rotor. The motorized wheel assembly further comprises a shaft connected to the stator. The motorized wheel assembly further includes an in-hub brake system. The brake system comprises a biasing system and an actuator plate in mechanical communication with the biasing system. The actuator plate is configured to at least partially move along or rotate relative to the shaft between a disengaged position and an engaged position. The brake system further includes a brake plate positioned about the shaft wherein the brake plate is spaced apart from the actuator plate. The brake system further includes a brake pad system in mechanical connection with the actuator plate. The motorized wheel assembly further includes a hub attached to and configured to rotate with the rotor, wherein the hub is disposed about the shaft and the in-hub brake system. The motorized wheel assembly further includes a tire disposed about the hub. The biasing system is configured to bias the actuator plate to the engaged position to cause the brake pad system to apply a force to the brake plate to prevent rotation of the hub and the tire.

In some embodiments, the in-hub brake system is configured to rotate about the shaft.

In some embodiments, the biasing system comprises a magnet, wherein the magnet is configured to attract the actuator plate to the engaged position. In some embodiments, the biasing system further comprises a magnetic plate adjacent to the actuator plate and misaligned with the actuator plate relative to the shaft. In some embodiments, the magnet is rotatable about magnet axis between a first position when the magnet is in magnetic communication with the actuator plate and a second position when the magnet is in magnetic communication with the magnetic plate. In some embodiments, the magnet provides a magnetic force that acts as a first biasing force to the actuator plate when the magnet is in the first position. The actuator plate is biased away from the magnet via a second biasing force to the disengaged position. The second biasing force is less than the first biasing force. The magnetic plate takes up a sufficient amount of the magnetic force from the magnet to enable the second biasing force to cause the actuator plate to transition to the disengaged position such that the brake pad system does not apply the force to the brake plate so as to enable rotation of the hub and the tire.

In some embodiments, the brake pad system comprises a fixed brake pad and a sliding brake pad within a sliding brake pad mount, and wherein the actuator plate is in mechanical communication with the sliding brake pad. In some embodiments, the actuator plate is fixed to a pivot plate, and wherein the pivot plate is in mechanical connection with the sliding brake pad mount, such that movement of the actuator plate about the pivot plate changes the position of the sliding brake pad.

In some embodiments, the wheel assembly is waterproof to at least IPX6.

In some embodiments, the tire is a balloon tire.

In some embodiments, the tire is an all-terrain tire.

In some embodiments, the biasing system is configured to prevent rotation of the hub and the tire in event of at least either (i) loss of power to the motor or (ii) ceasing operation of the motor.

In another example embodiment, a motorized wheel assembly is provided. The motorized wheel assembly comprises an in-hub motor comprising a stator and a rotor, as well as a shaft defining a first end and a second end. The first end of the shaft is connected to the stator. The motorized wheel assembly includes a shaft attachment connected to the second end of the shaft; and at least one connection wire in electrical communication with the stator and extending to a connection wire interface. The at least one connection wire is configured to supply power to the motor from an external power source. The motorized wheel assembly further includes a hub attached to and configured to rotate with the rotor. The hub is disposed about a portion of the shaft. The portion of the shaft extends between the first end and a seal position, and the seal position is between the first end and the second end of the shaft. The motorized wheel assembly further includes a sealing plate disposed within the hub at the seal position; and a tire disposed about the hub. The connection wire interface is external to the sealing plate, and the at least one connection wire extends at least partially within the shaft and extends external to the shaft after the seal position and prior to the shaft attachment such that the shaft attachment is attachable to any axle of a moveable device with the connection wire interface being external to such attachment.

In some embodiments, the at least one connection wire and the connection wire interface do not rotate with the rotor and tire. In some embodiments, the motorized wheel assembly further comprises at least one boss attached to the shaft, and at least one bush in mechanical connection with the hub configured to rotate about the at least one boss and the at least one connection wire. The at least one boss being configured to distribute load generated by the motorized wheel assembly along the shaft.

In some embodiments, the shaft attachment is configured to attach to any axle.

In some embodiments, the wheel assembly is waterproof.

In some embodiments, the motorized wheel assembly further comprises an in-hub braking system, wherein the in-hub braking system is disposed within the hub.

In some embodiments, the at least one connection wire is configured to supply communication signals to the motor from an external communication source.

In another example embodiment, a motorized wheel assembly configured for use on sand is provided. The motorized wheel assembly comprises an in-hub motor comprising a stator and a rotor; as well as a shaft connected to the stator. The motorized wheel assembly further includes at least one connection wire in electrical communication with the stator, wherein the at least one connection wire is configured to supply power to the motor from an external power source. The motorized wheel assembly further includes a hub attached to and configured to rotate with the rotor; and a balloon tire disposed about the hub.

In some embodiments, the motorized wheel assembly is waterproofed to at least IPX6. In some embodiments, the motorized wheel assembly further comprises a sealing plate configured to seal the hub opposite the in-hub motor; a first sealing ring disposed between the in-hub motor and the hub; a second sealing ring disposed between the sealing plate and the hub; a shaft sealing ring disposed between the shaft and the sealing plate; and a connection wire sealing ring disposed between the at least one connection wire and the sealing ring.

In some embodiments, the motorized wheel assembly further comprises an in-hub brake system.

Additionally, example embodiments of a hub assembly and various further subassemblies are also contemplated herein, as well as related methods of use and methods of manufacturing.

BRIEF DESCRIPTION OF THE DRAWINGS

Figures 1A, 1B:
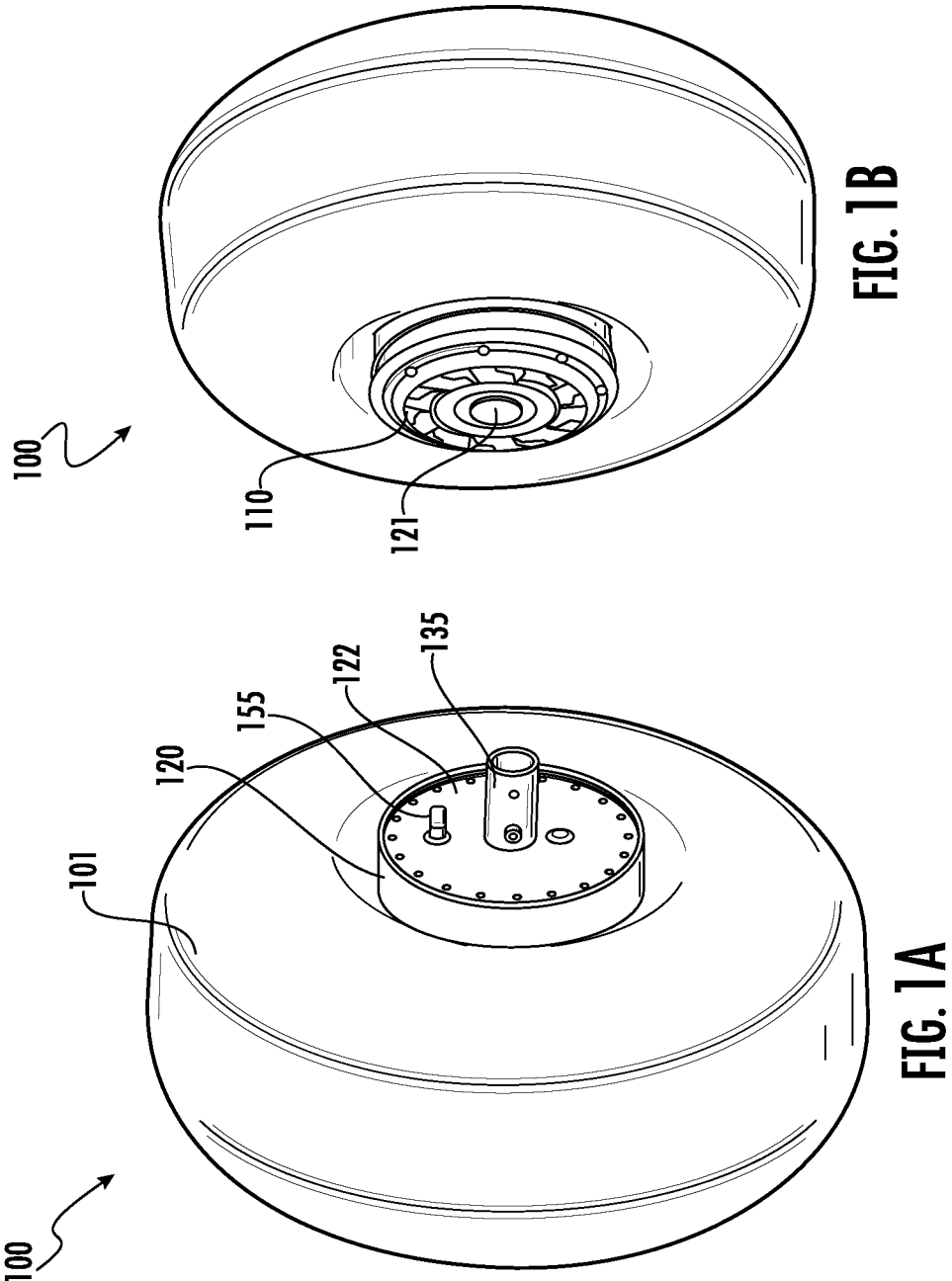
Figure 2:
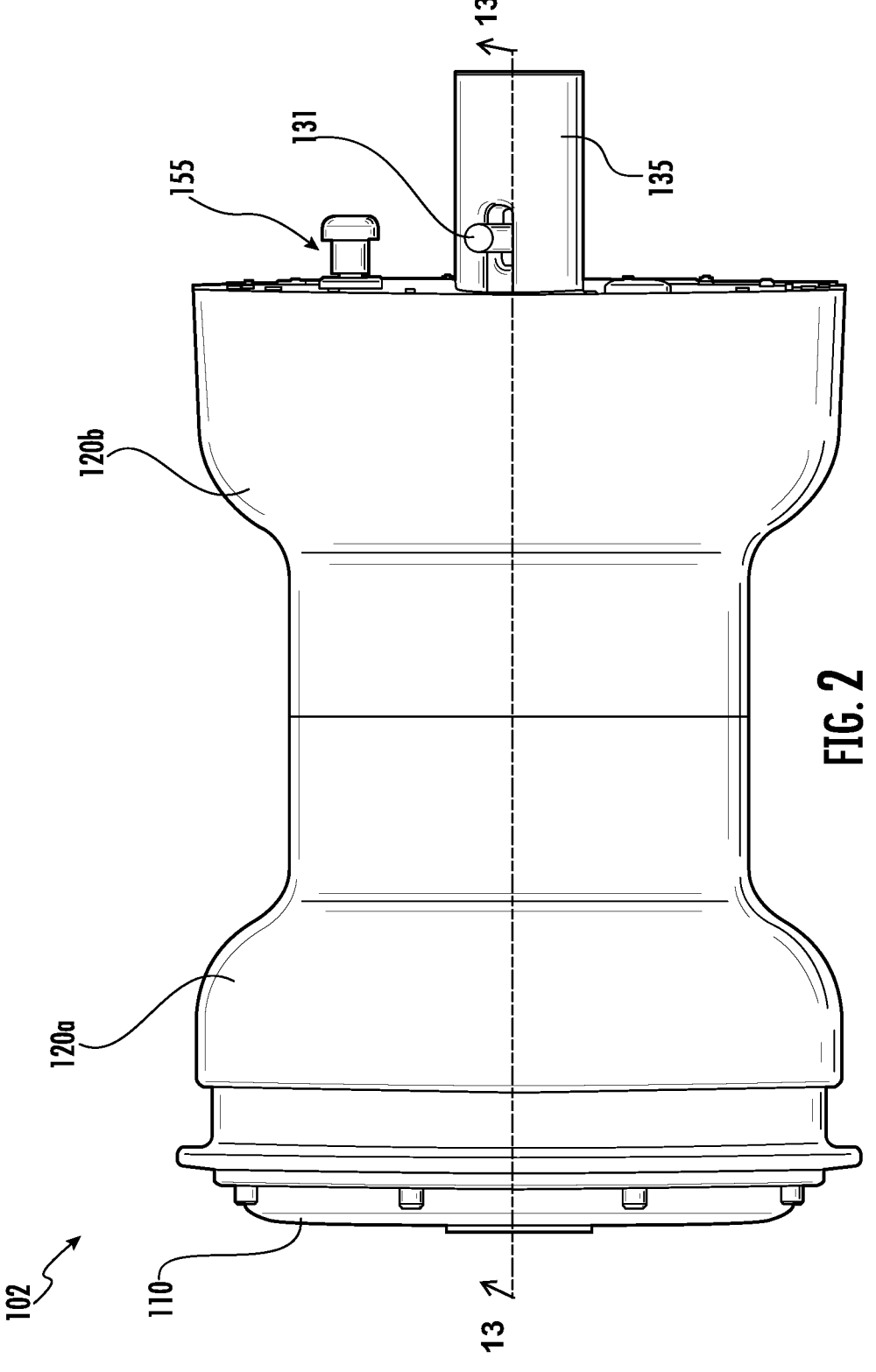
Figure 3A:
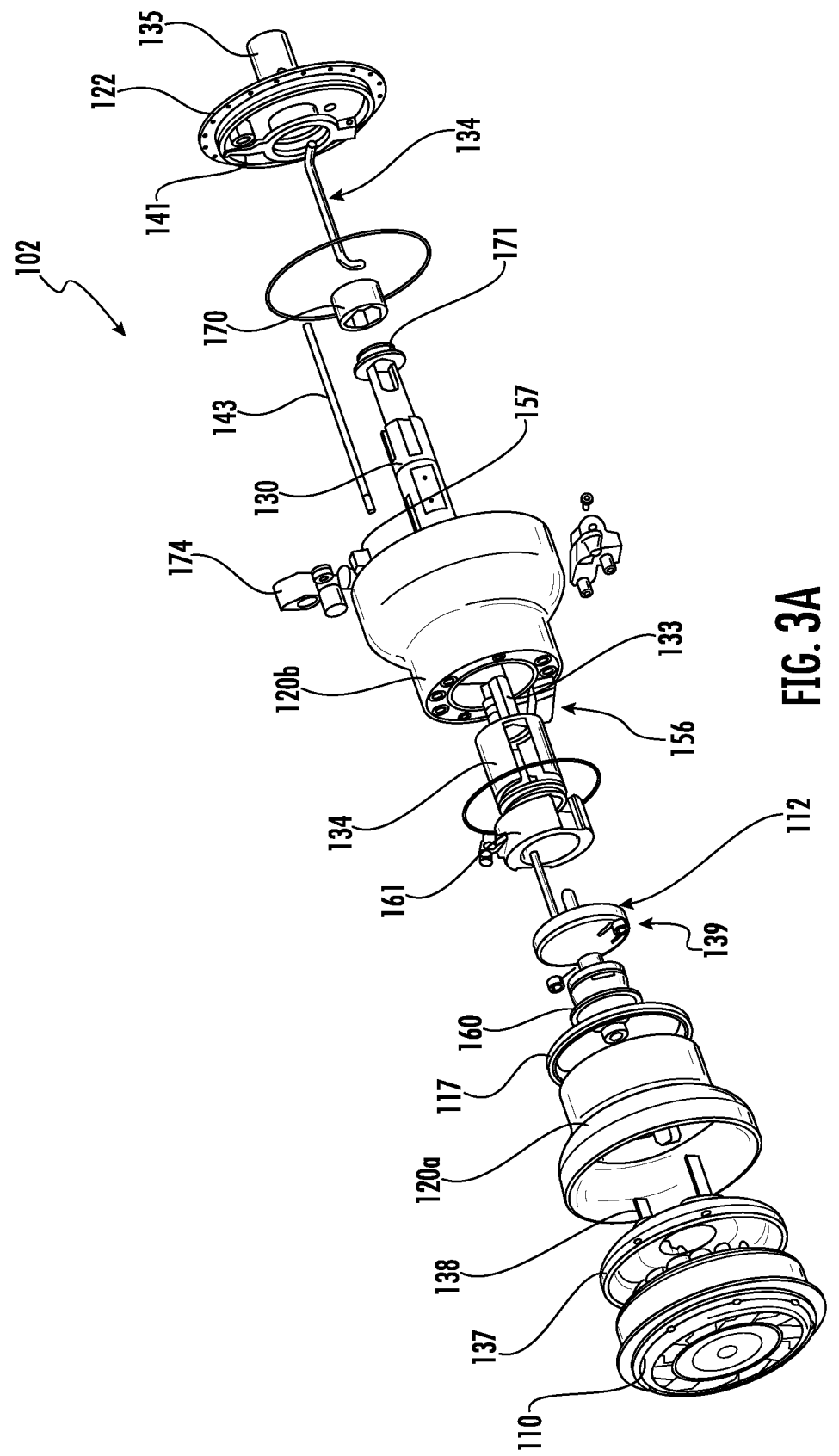
Figure 3B:
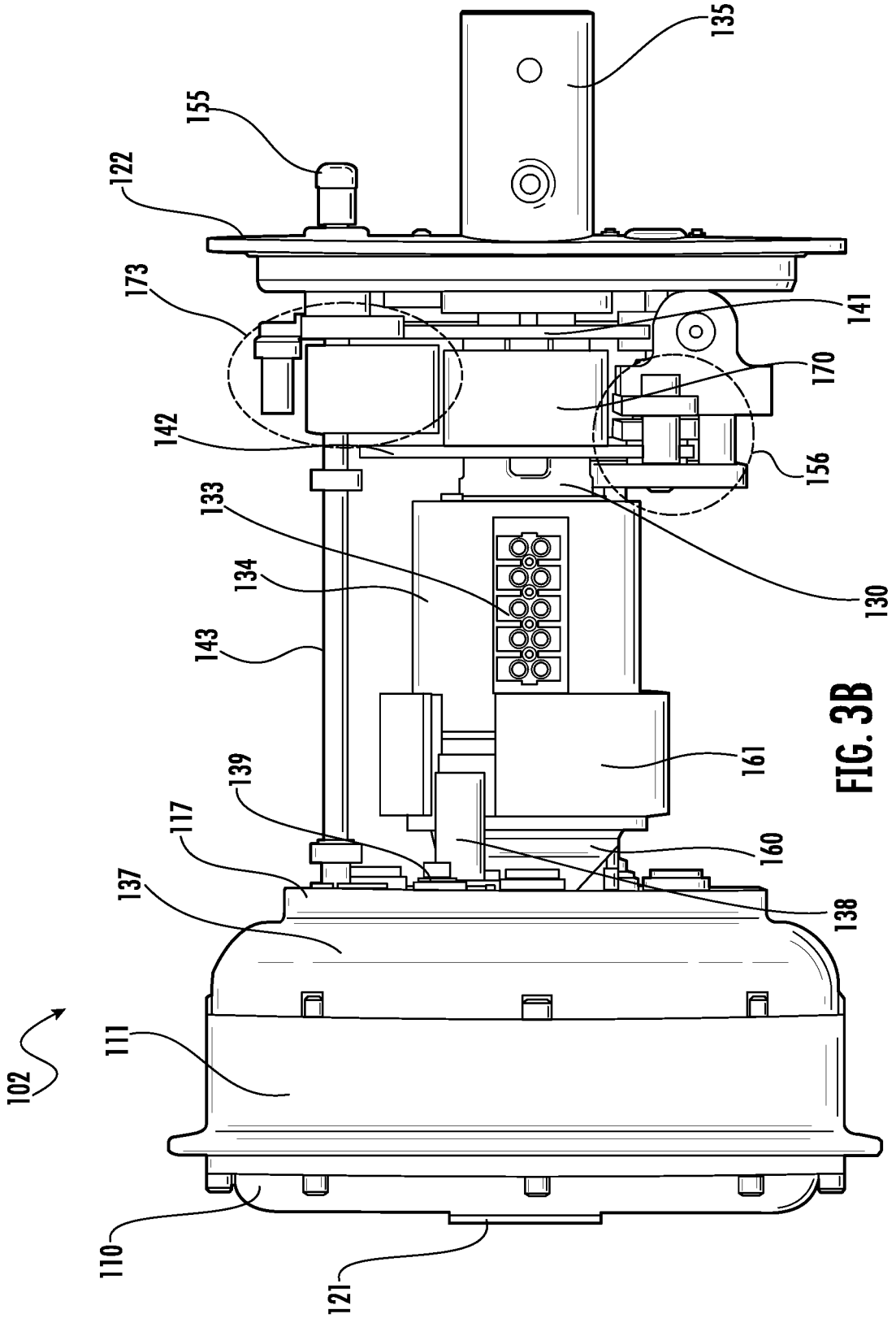
Figure 4A:
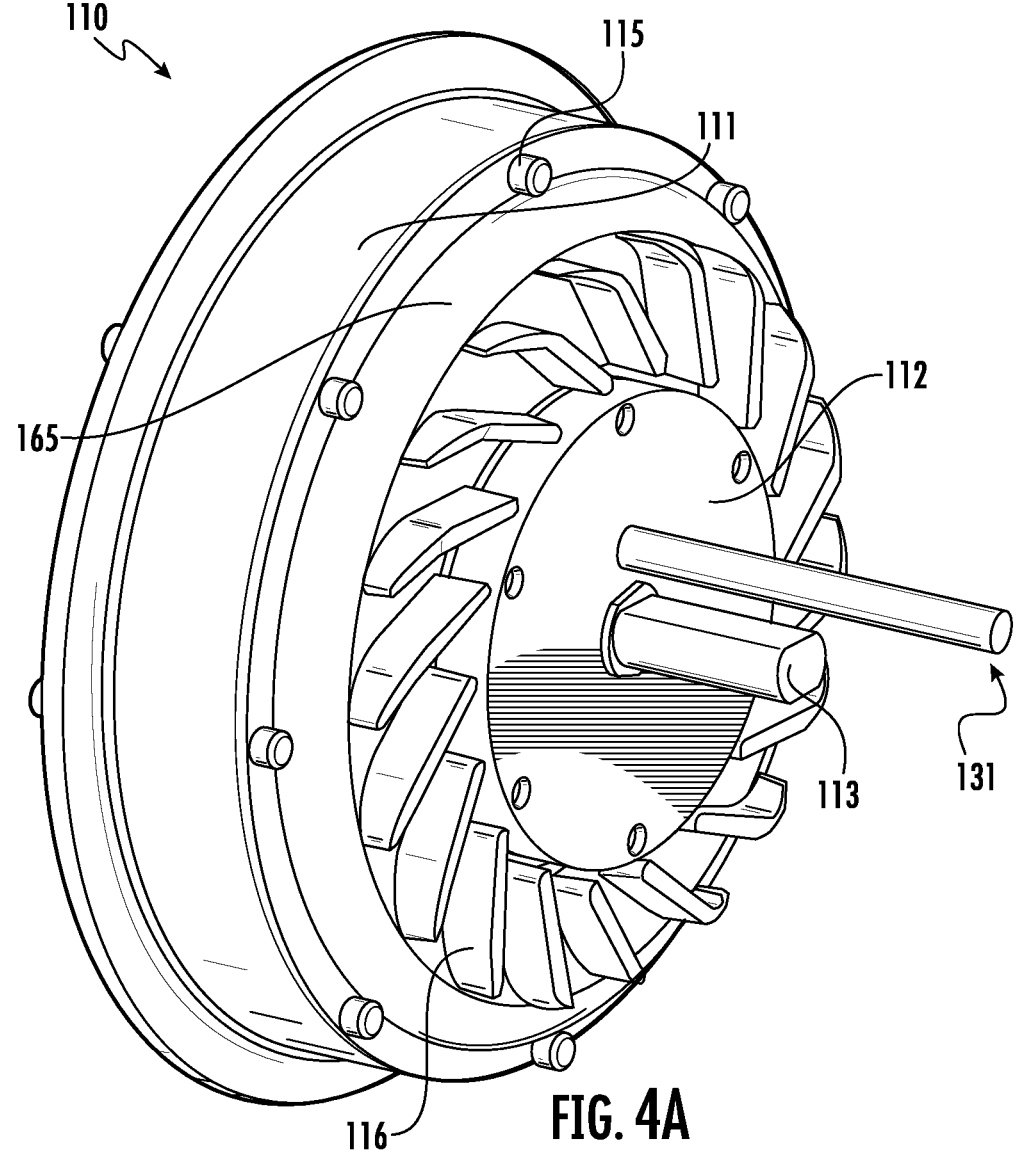
Figure 4B:
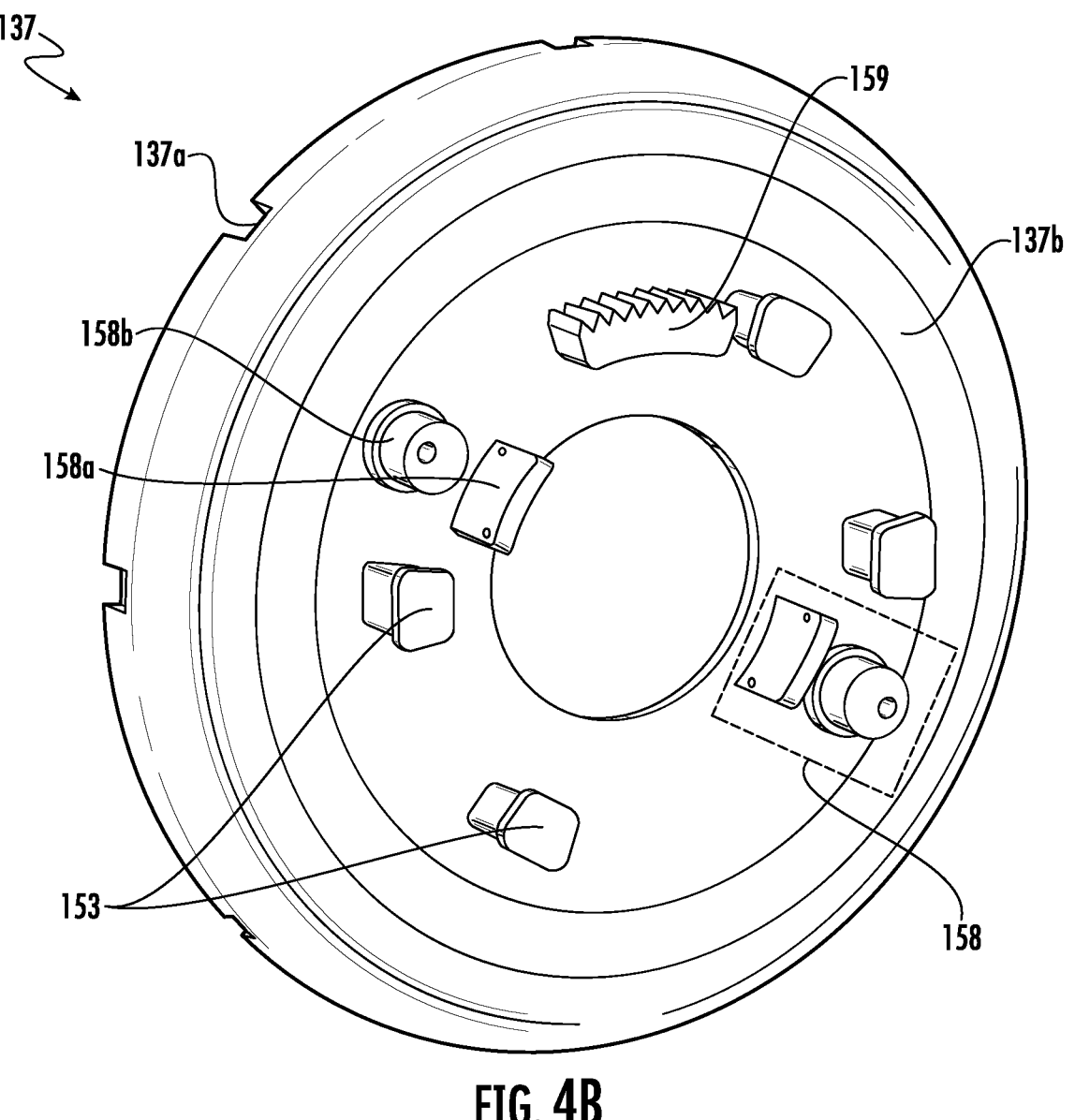
Figure 4C:
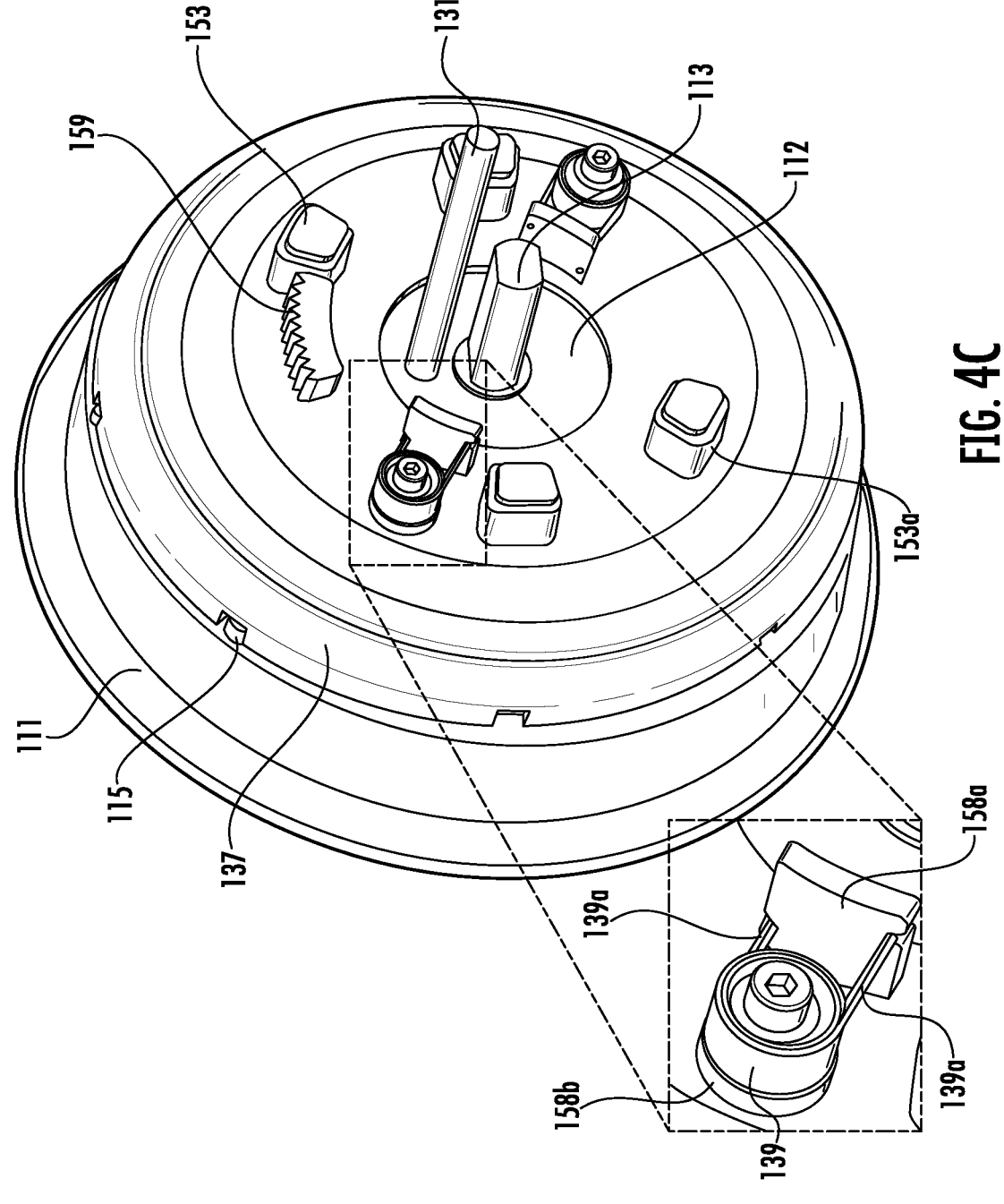
Figure 5A:
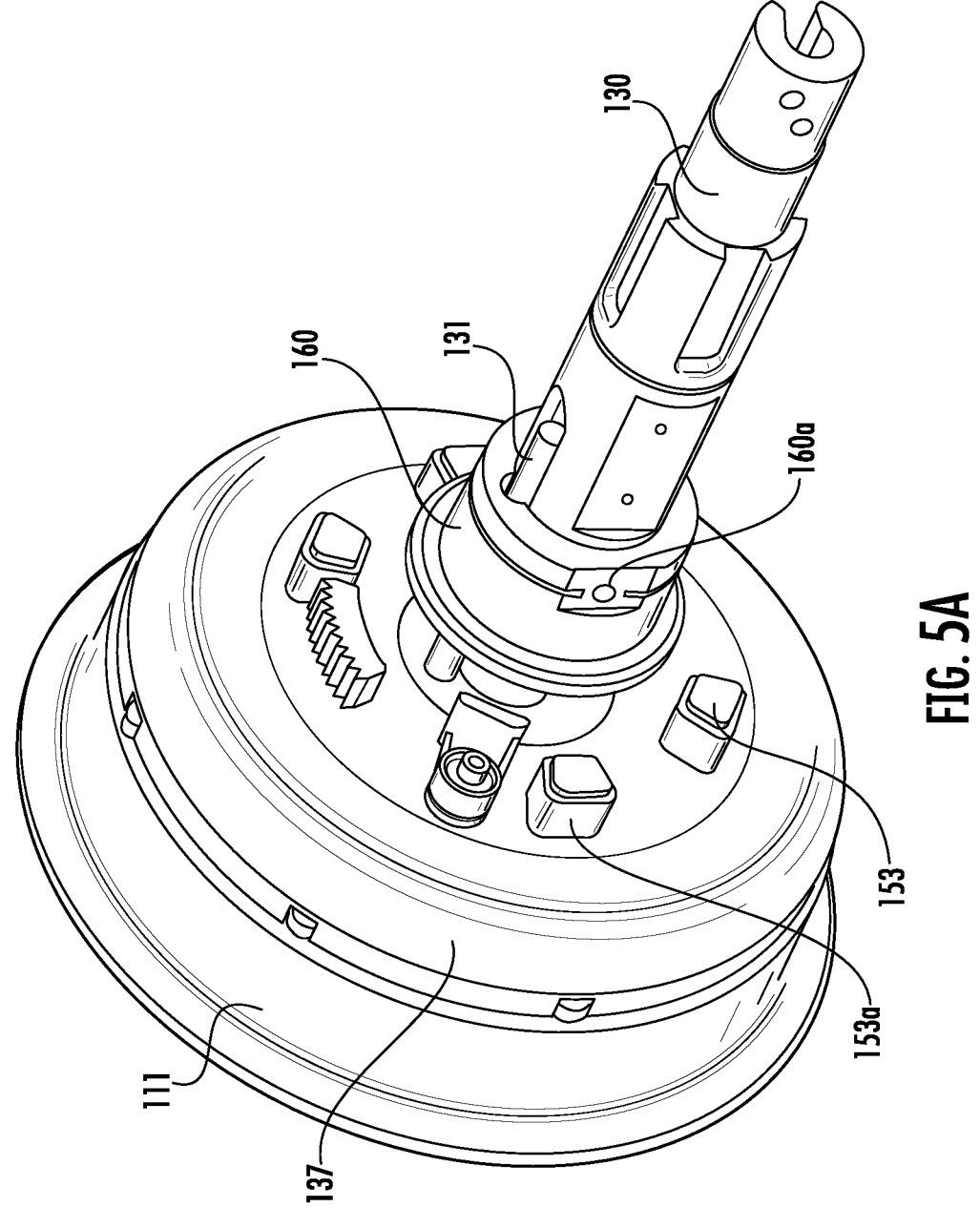
Figure 5B:
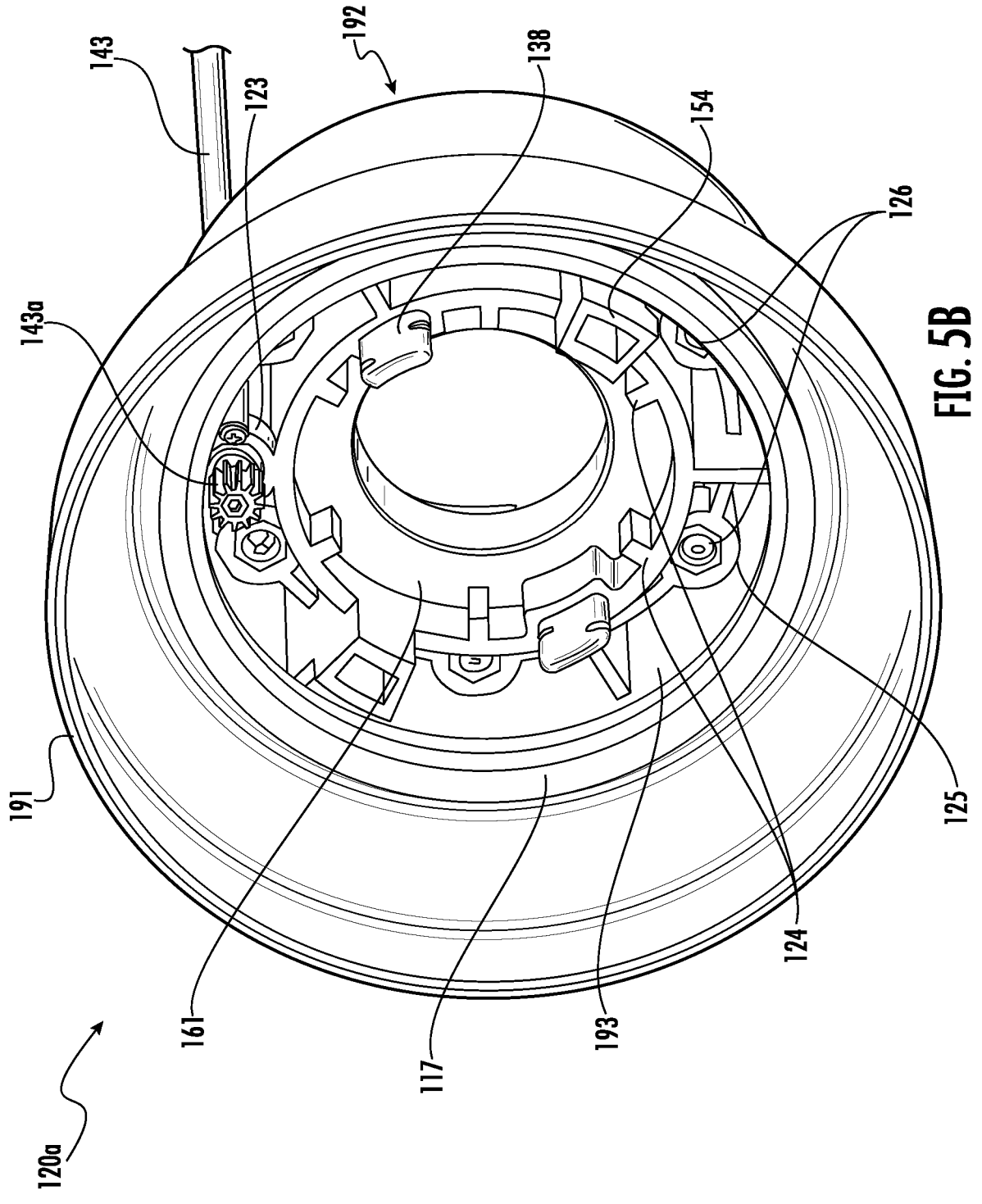
Figure 5C:
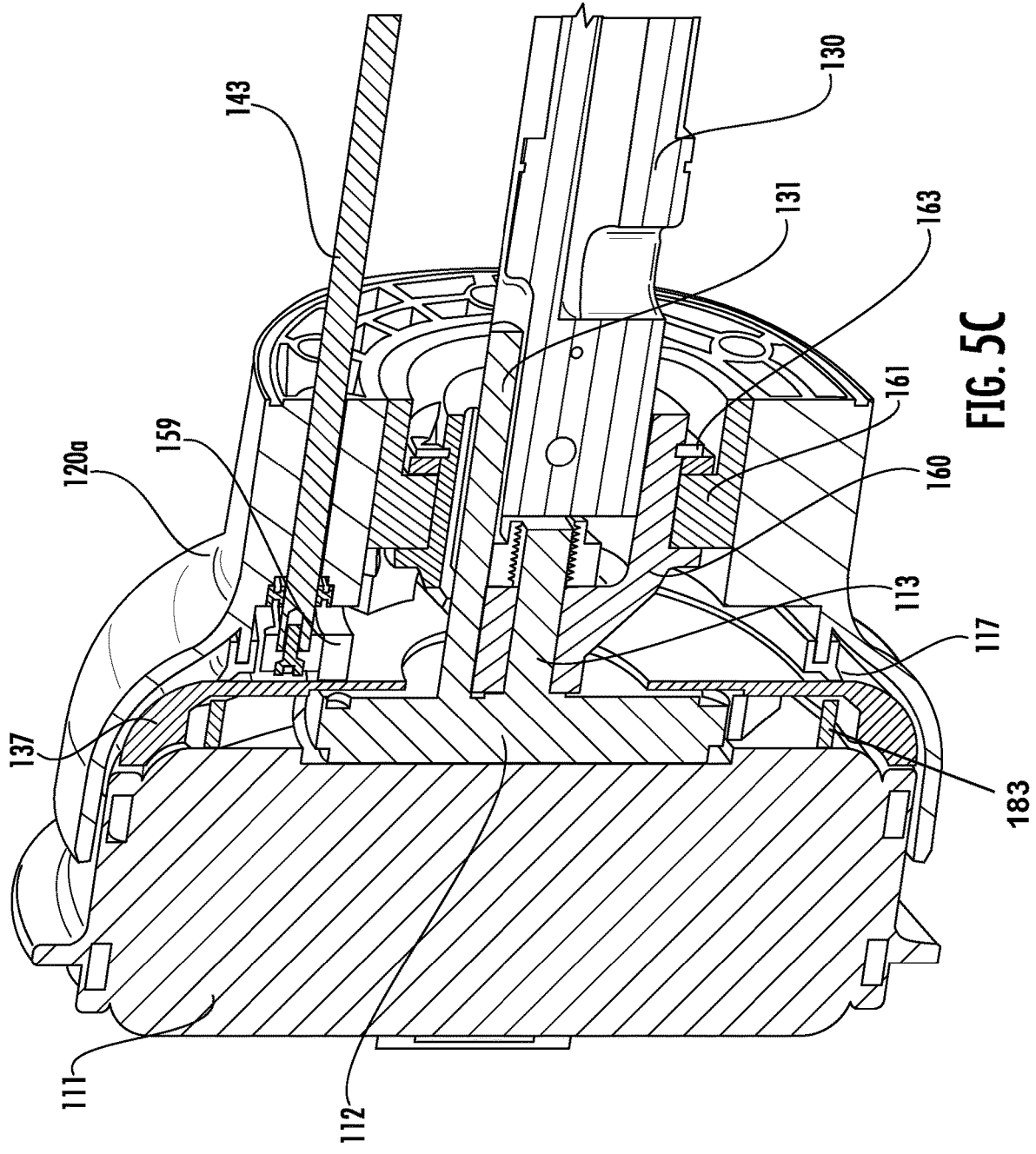
Figure 6:
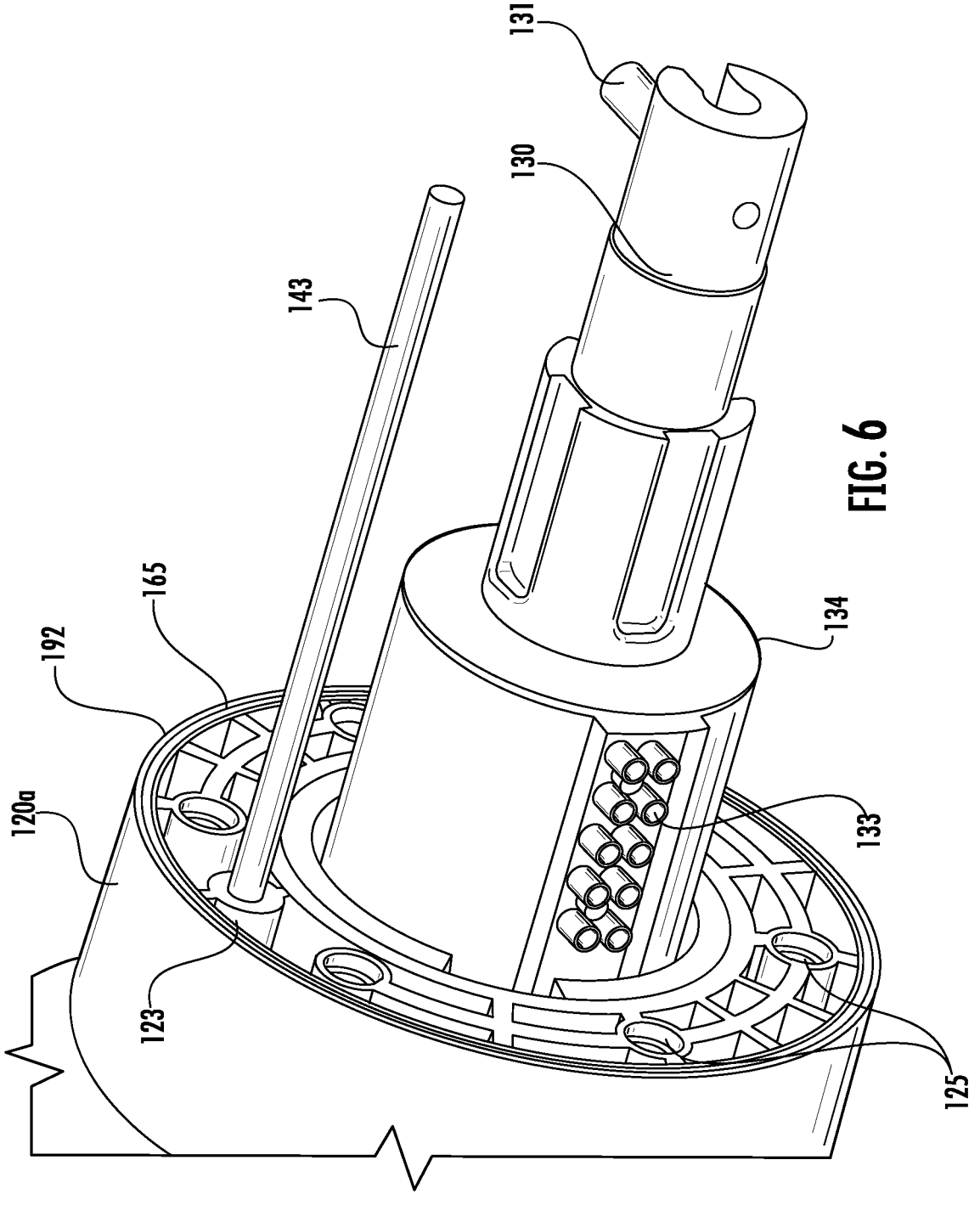
Figure 7A:
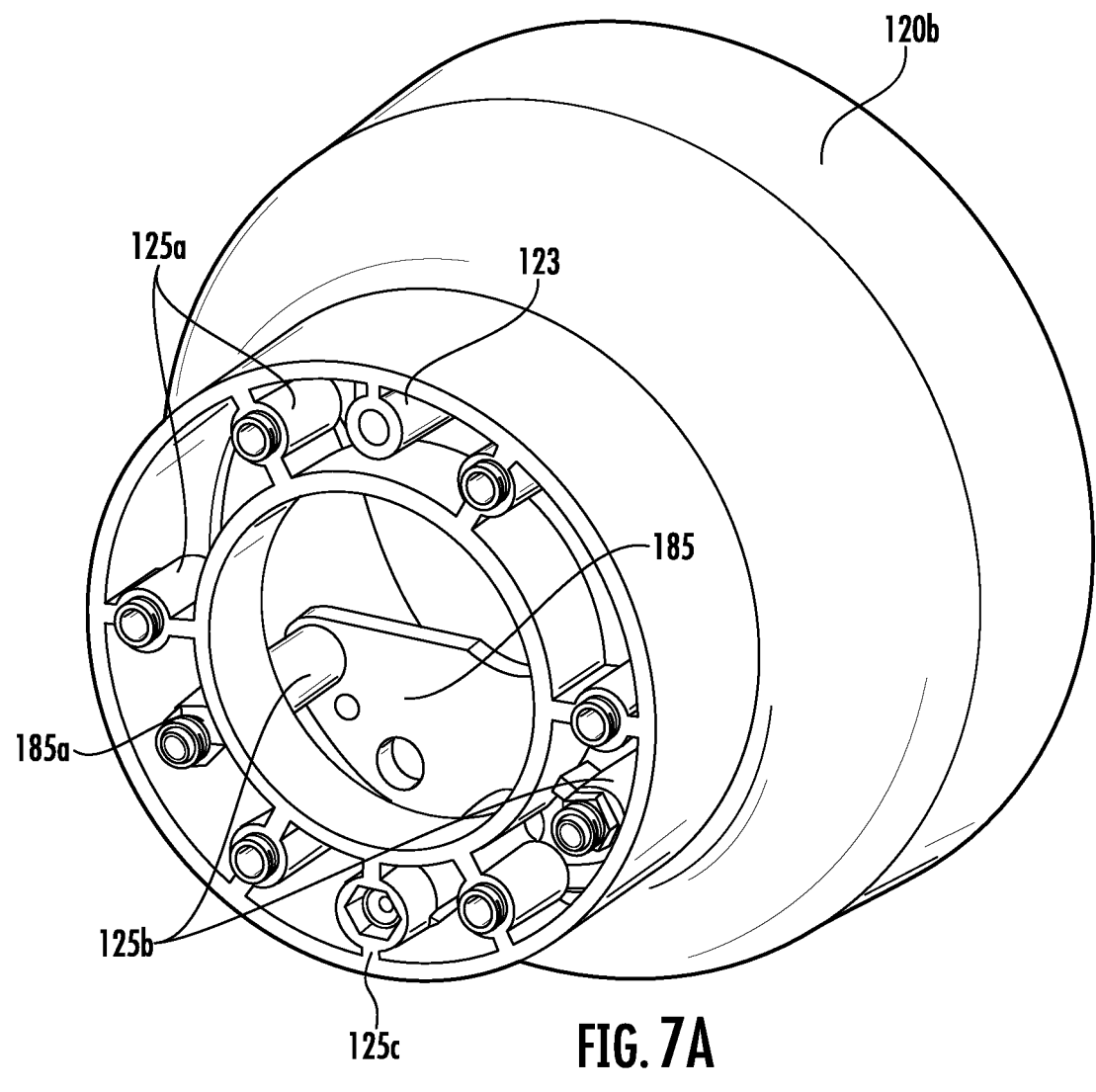
Figure 7B:
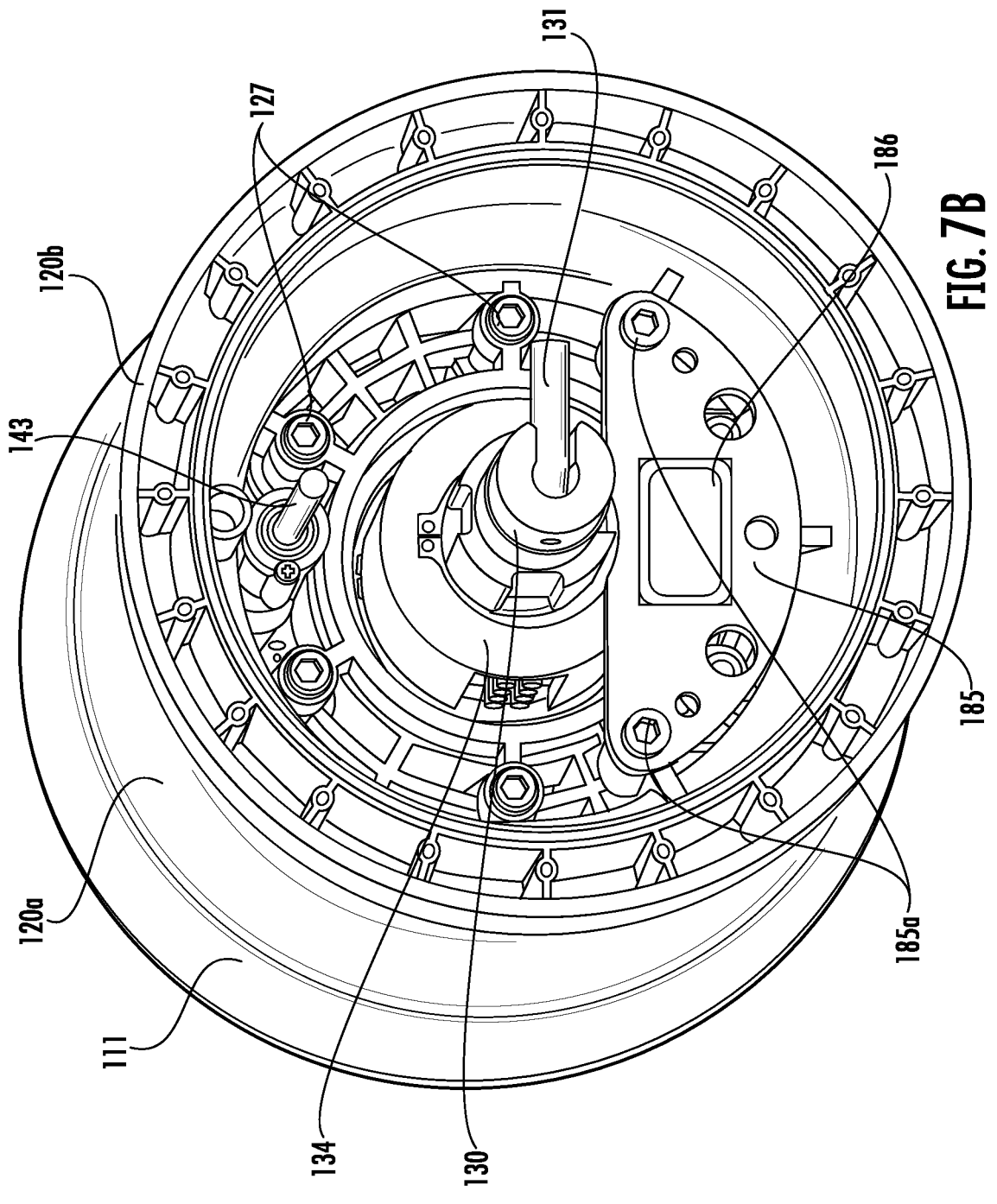
Figure 8A:
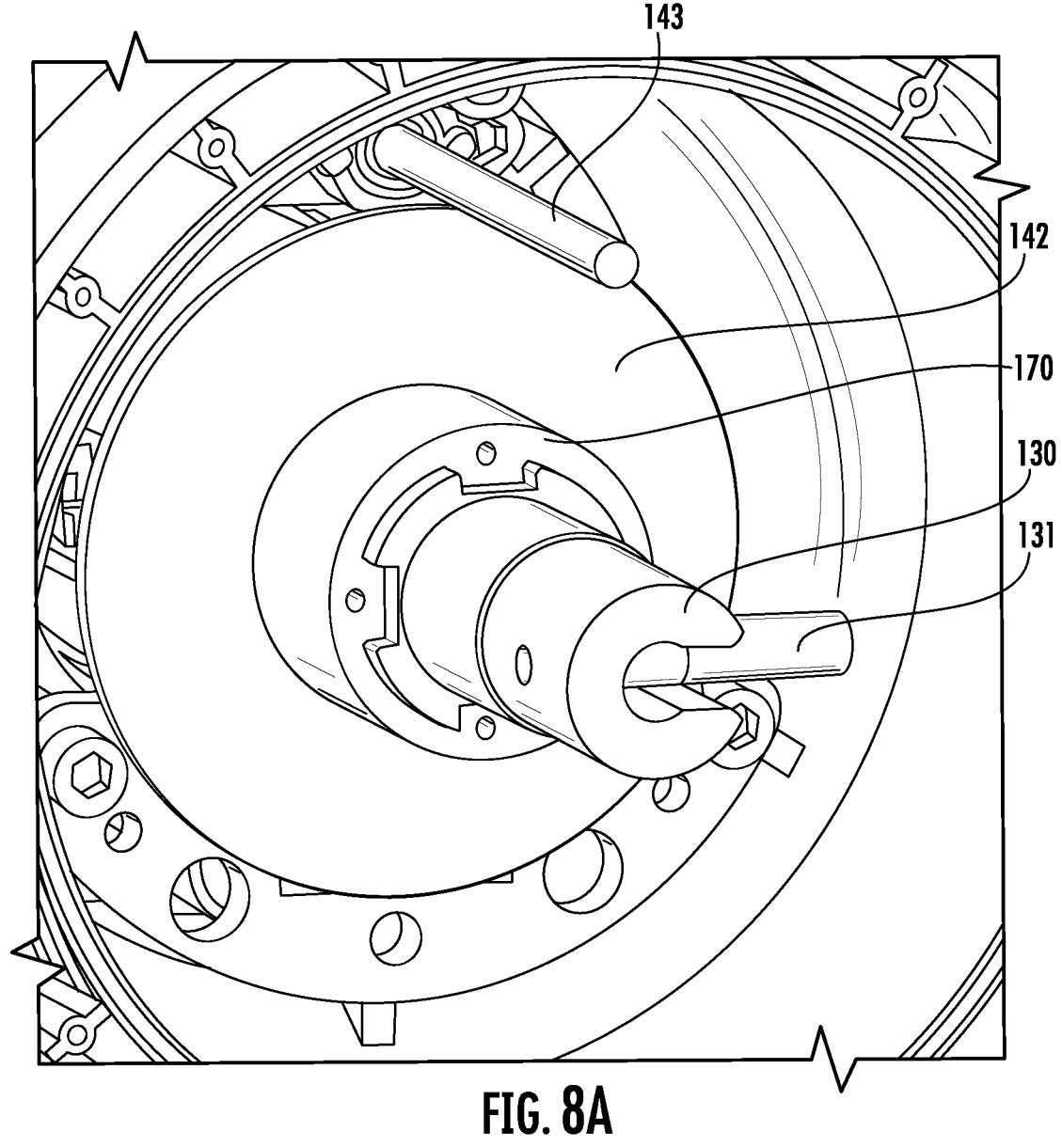
Figure 8B:
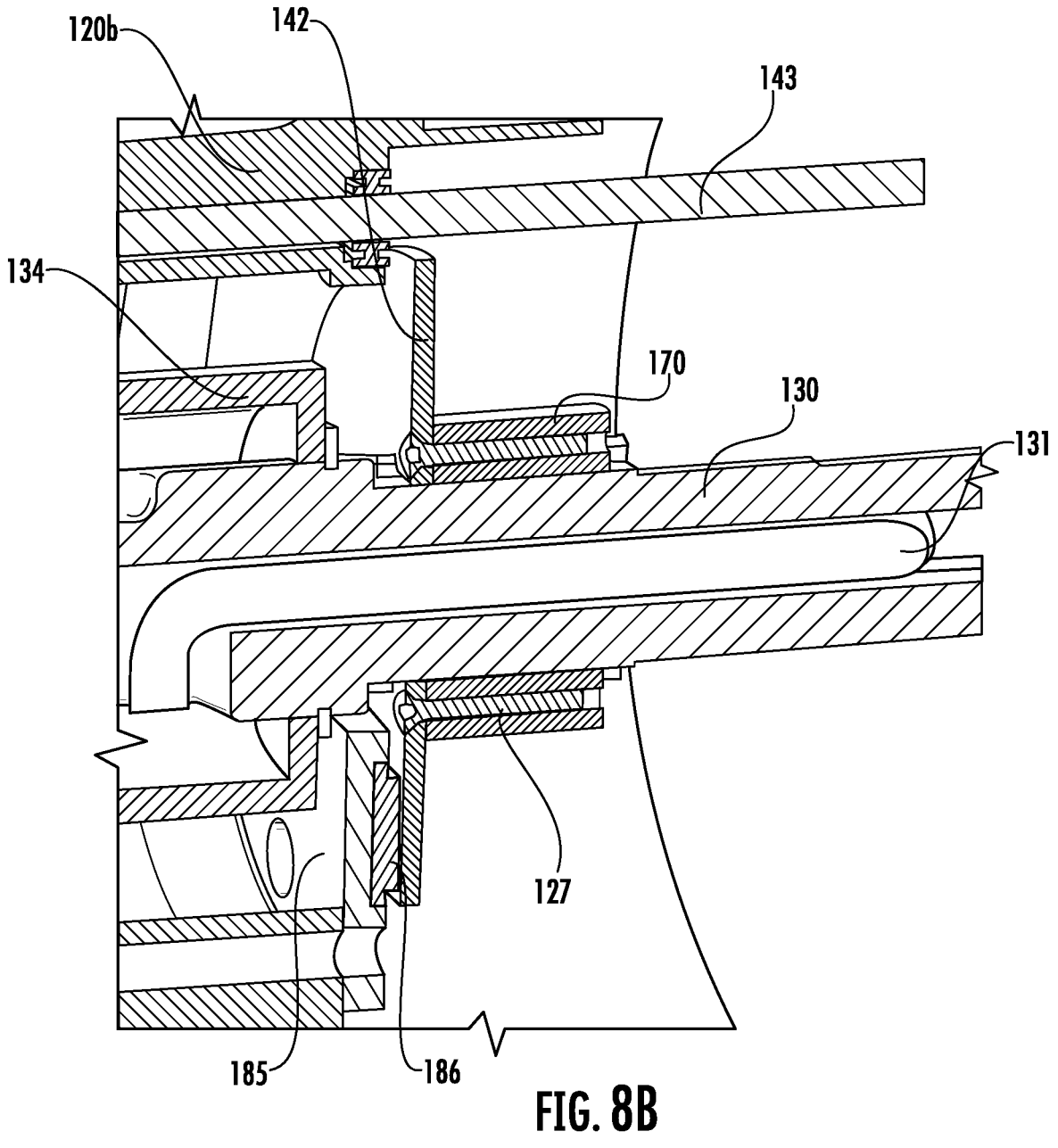
Figure 8C:
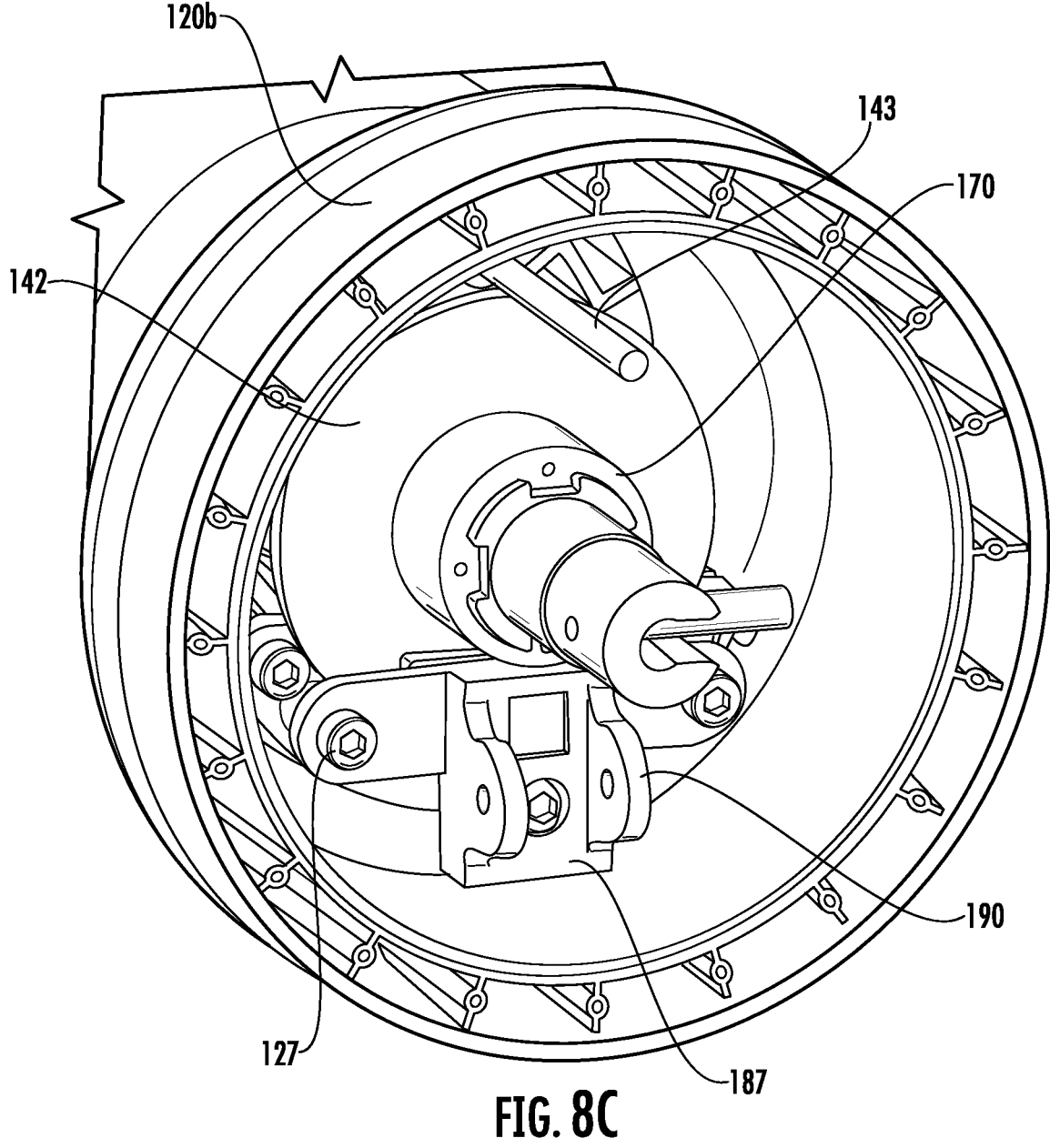
Figure 8D:
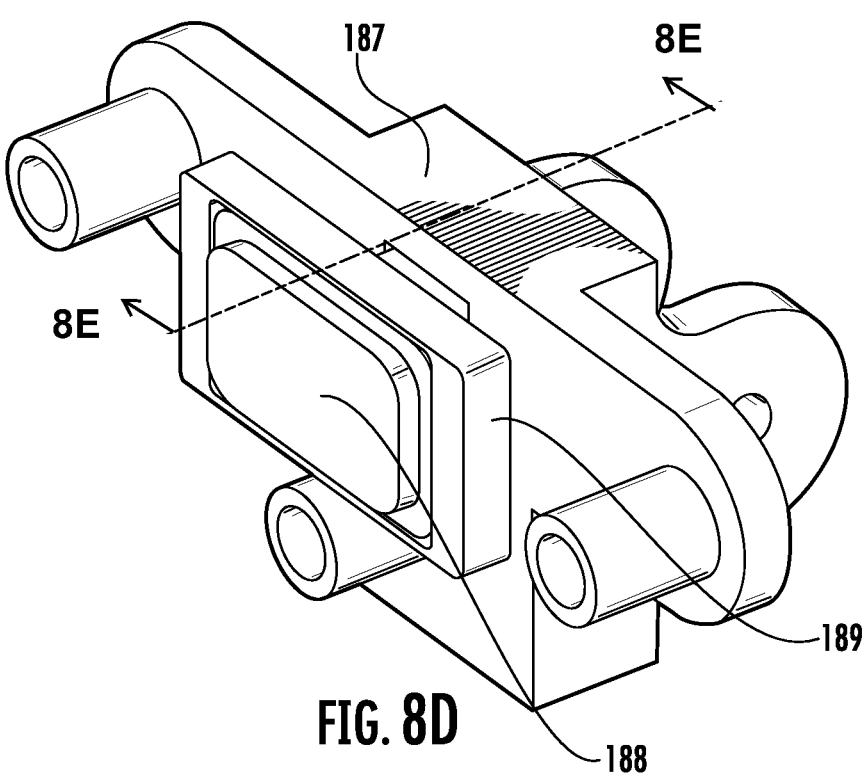
Figure 8E:
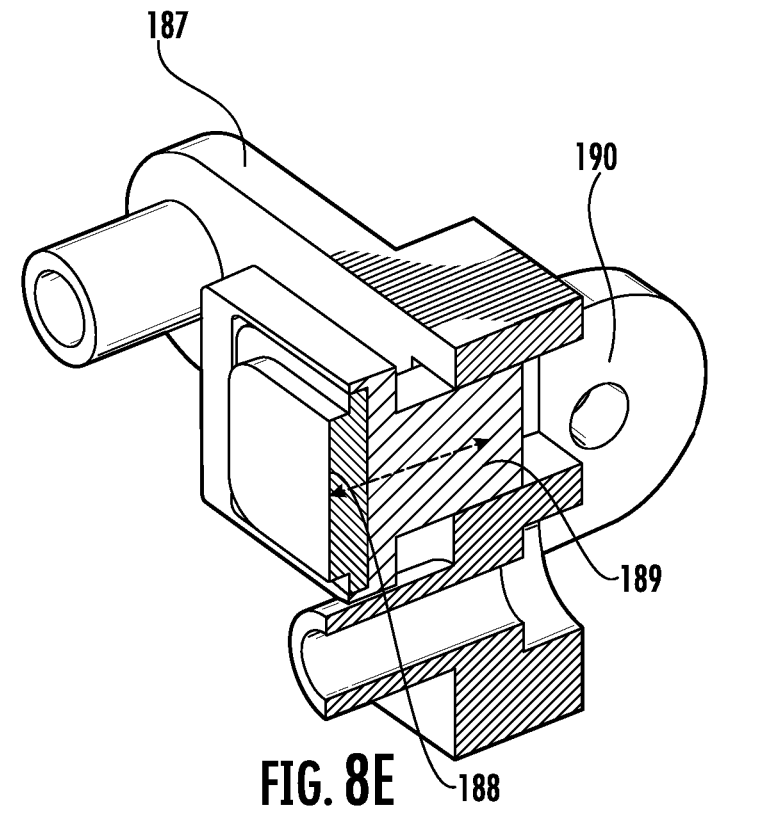
Figure 9A:
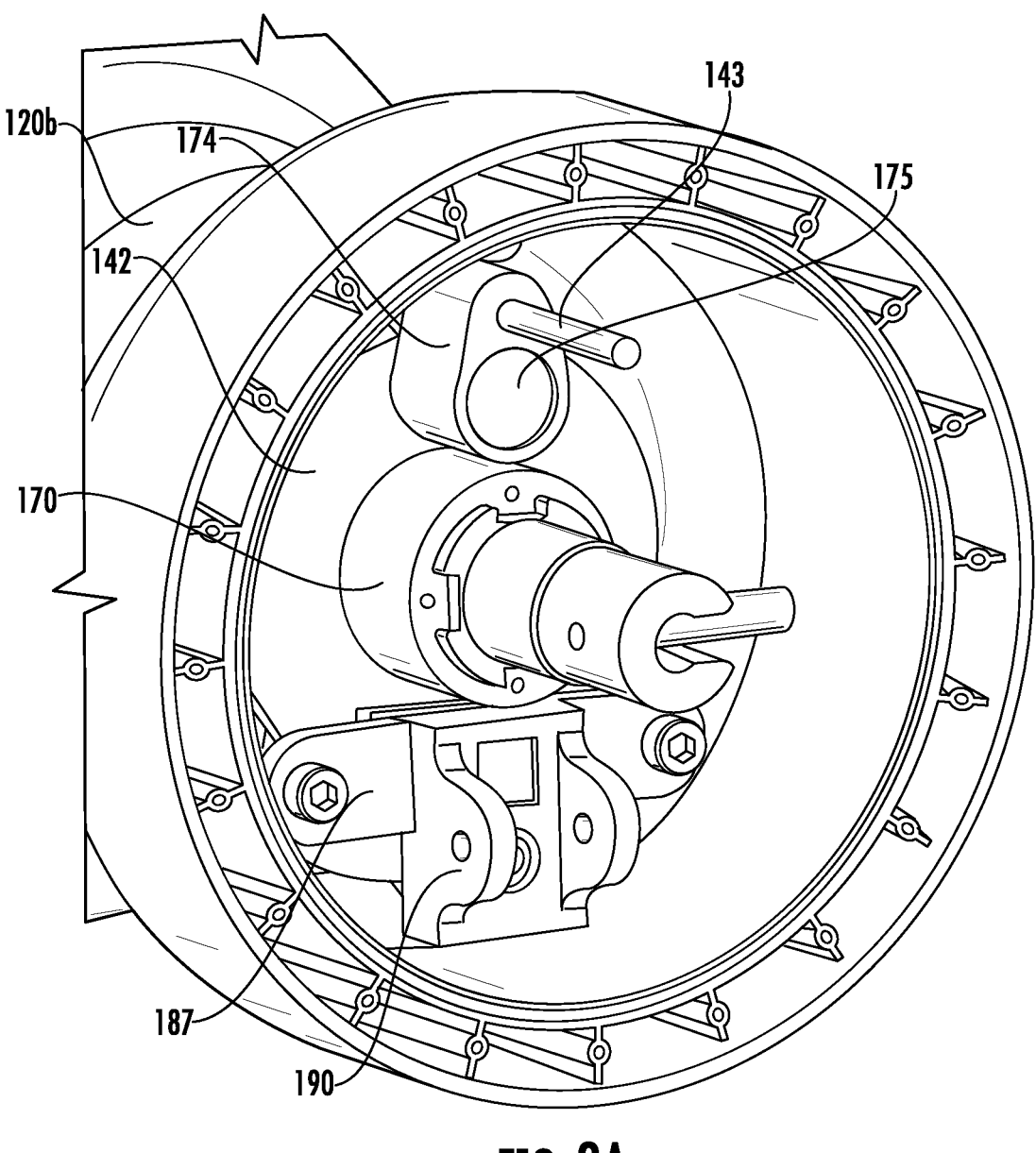
Figure 9B:
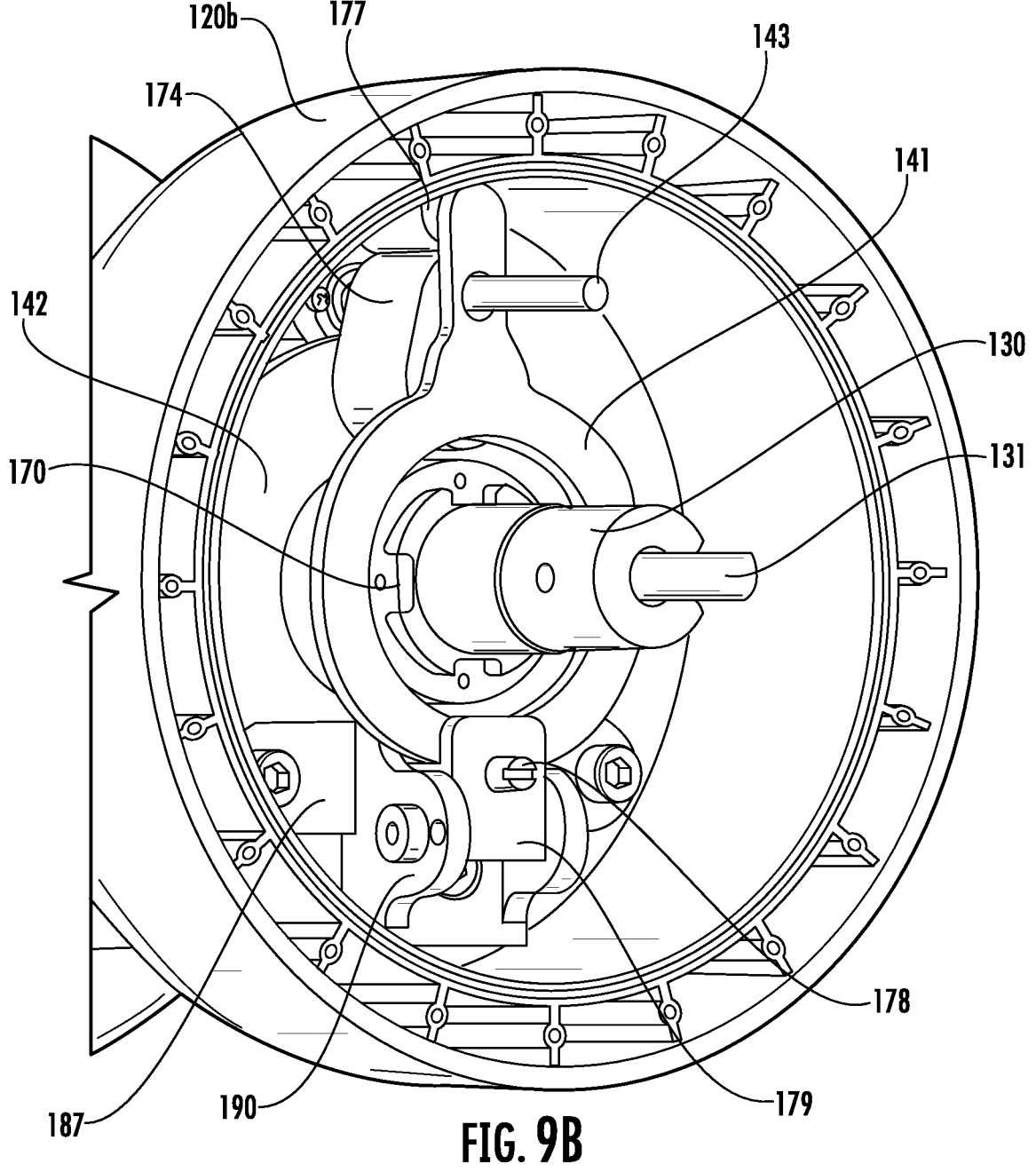
Figure 9C:
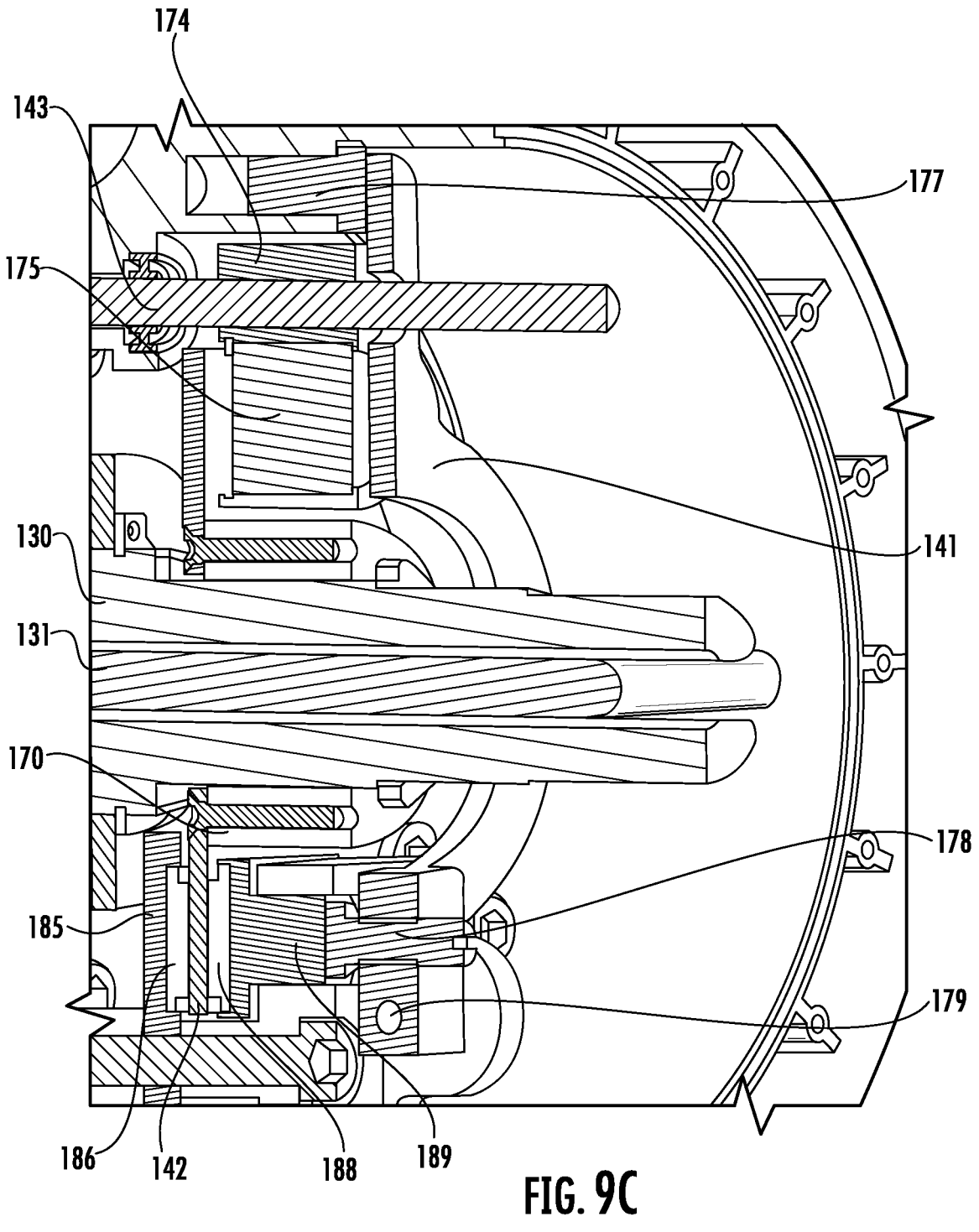
Figure 10A:
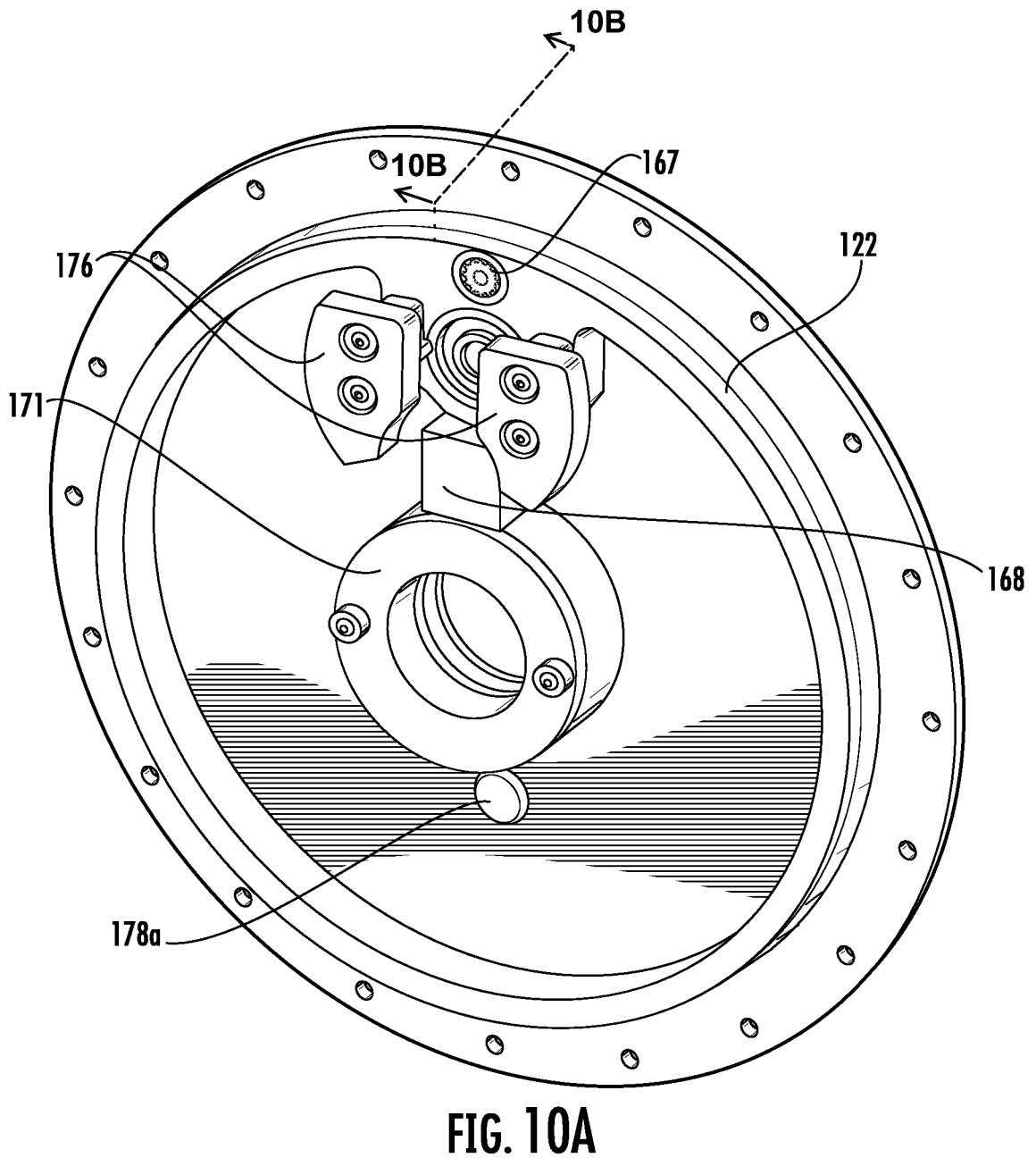
Figure 10B:
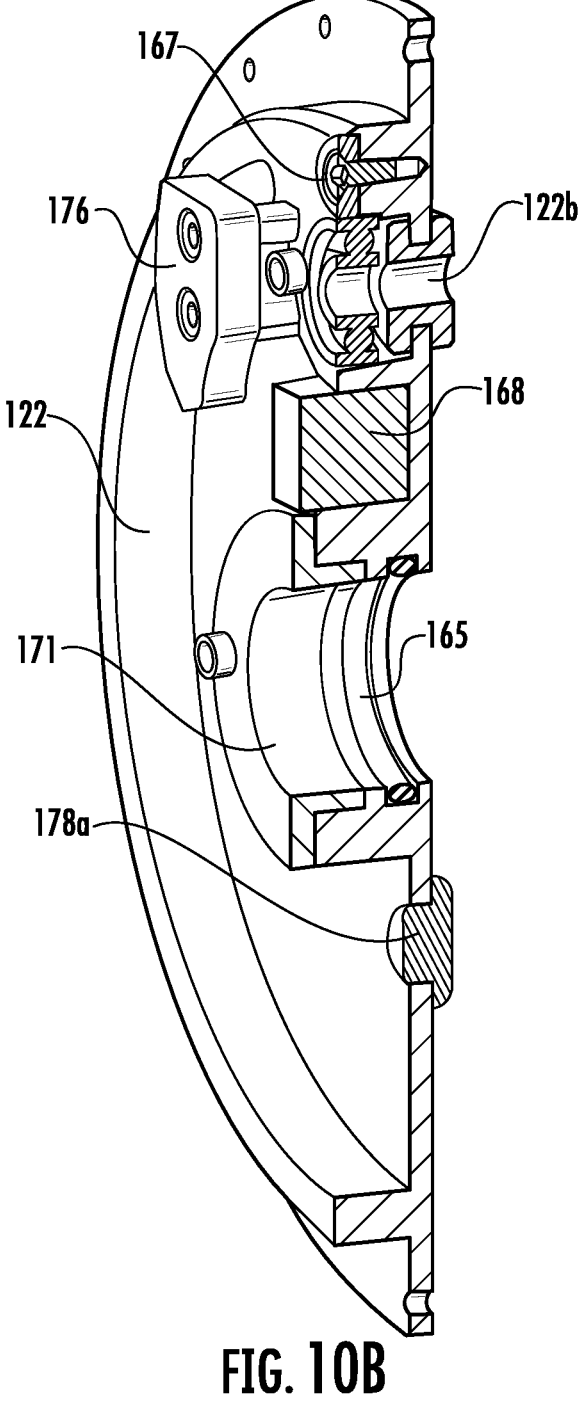
Figure 10C:
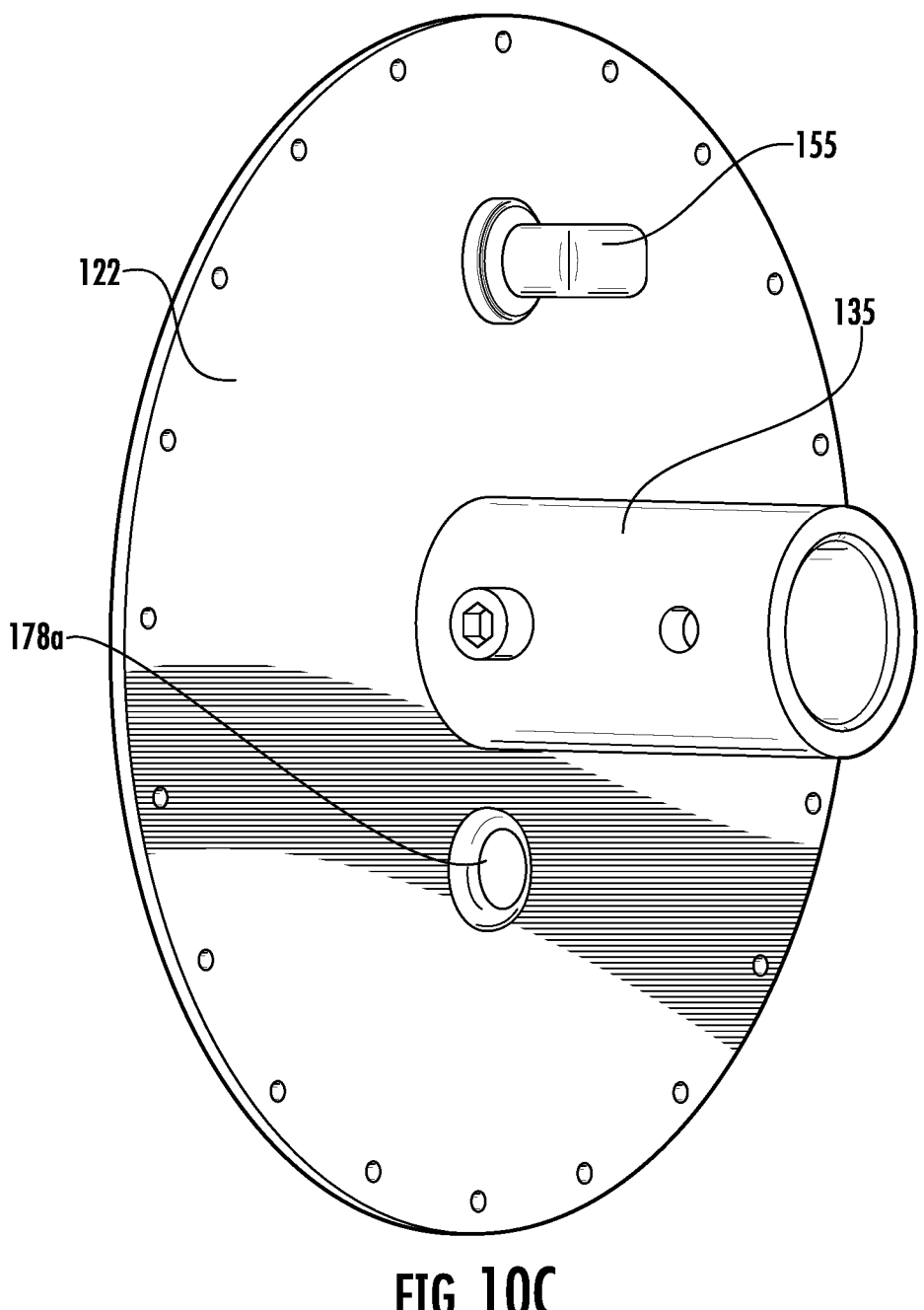
Figure 11A:
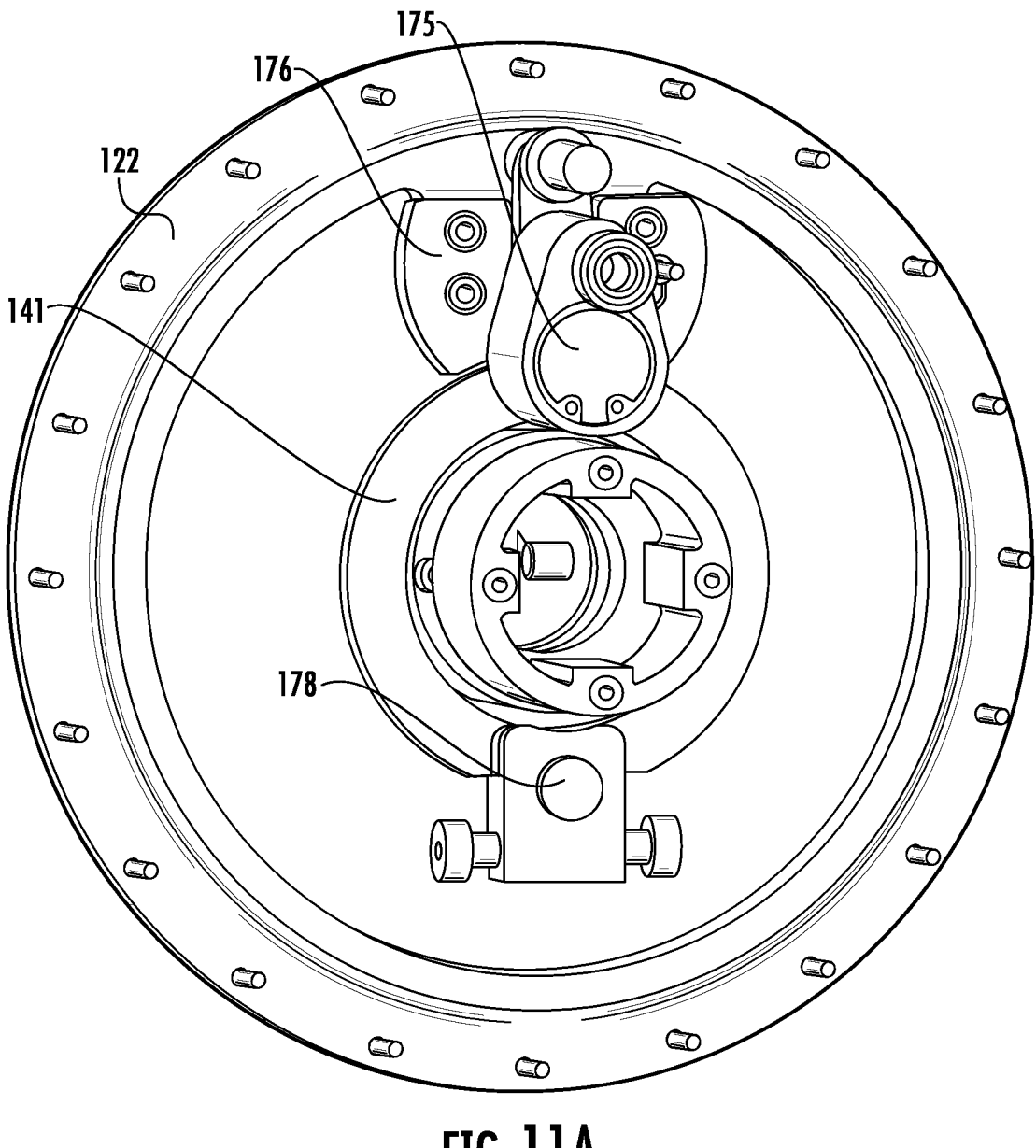
Figure 11B:
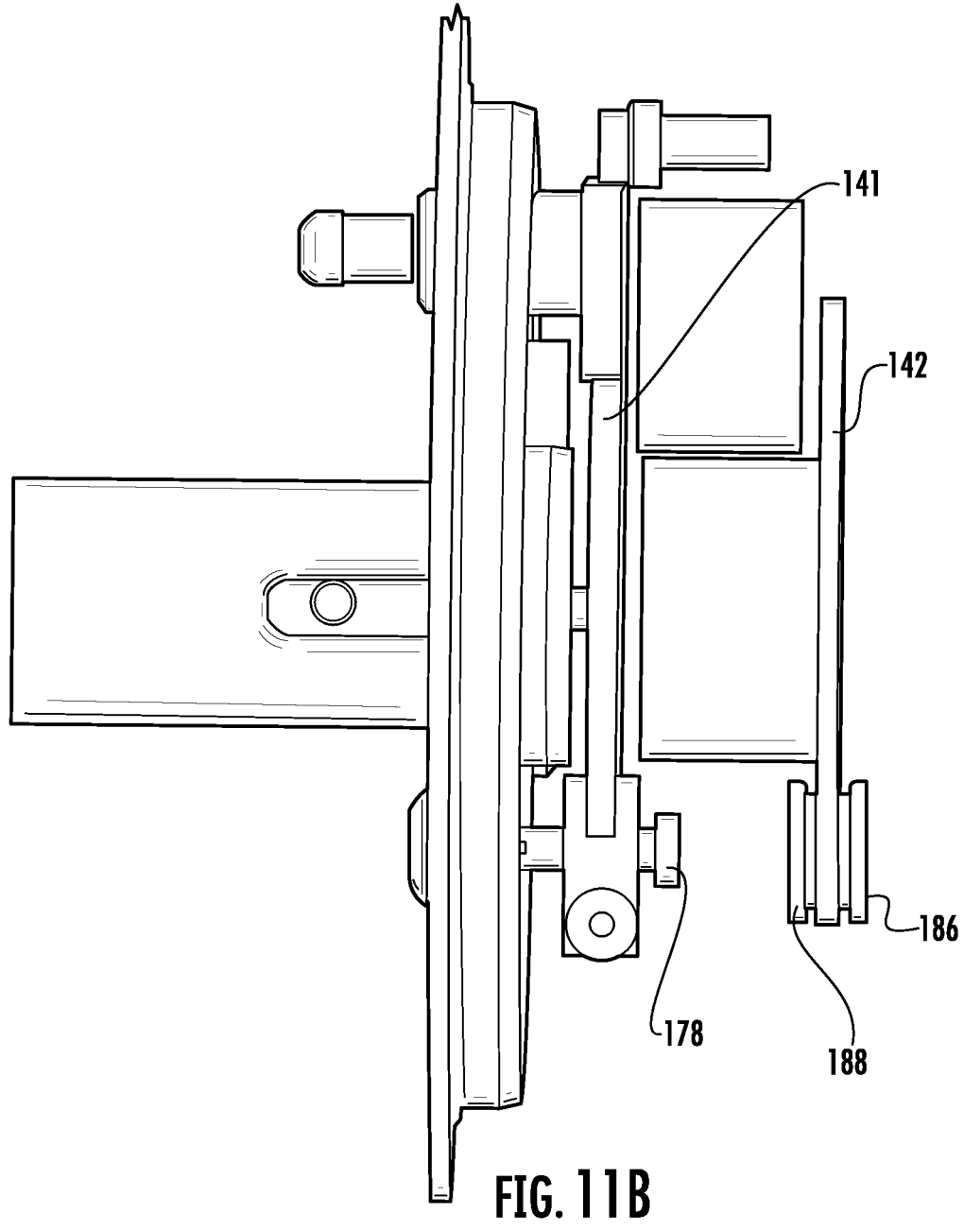
Figure 11C:
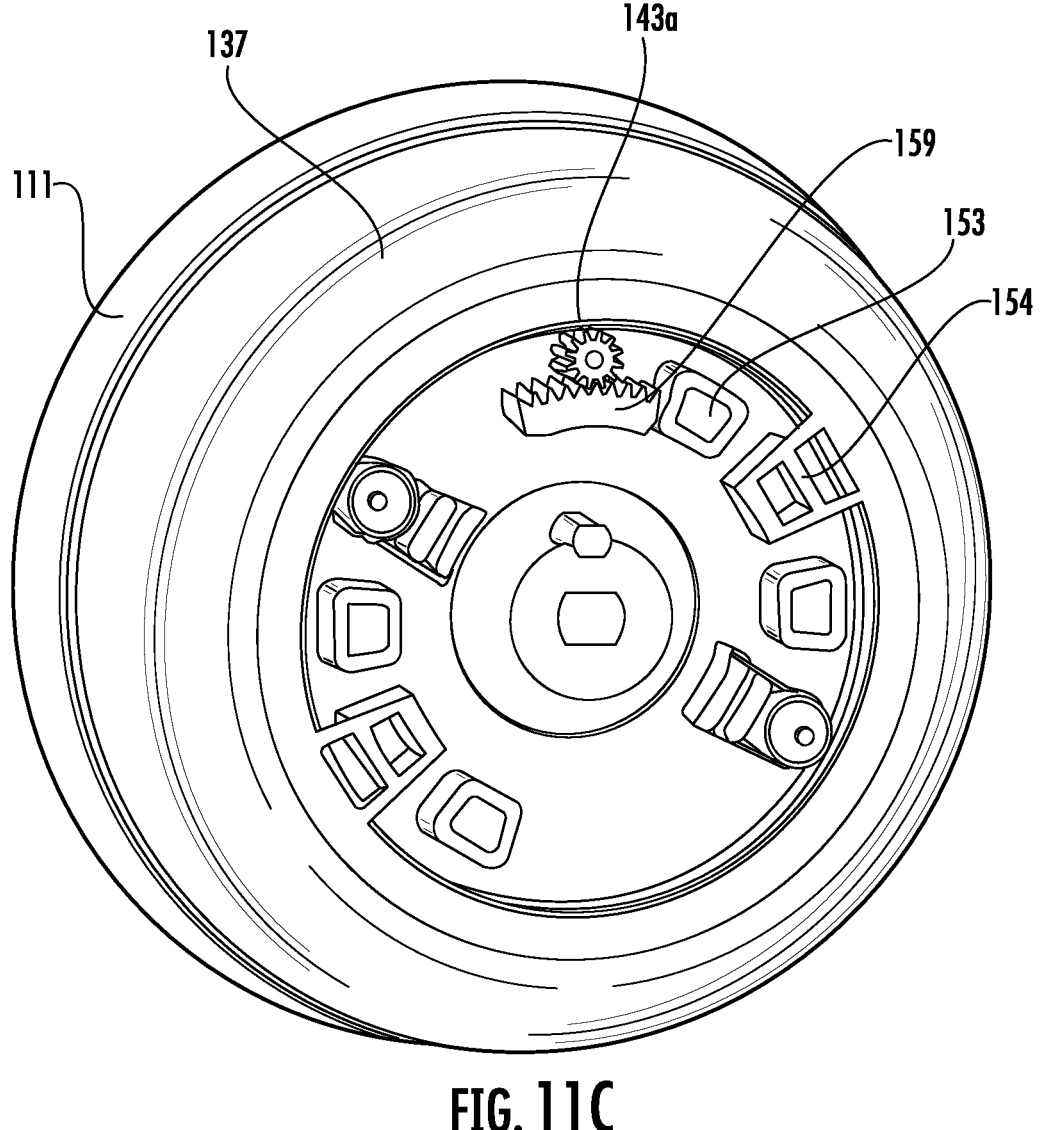
Figure 12A:
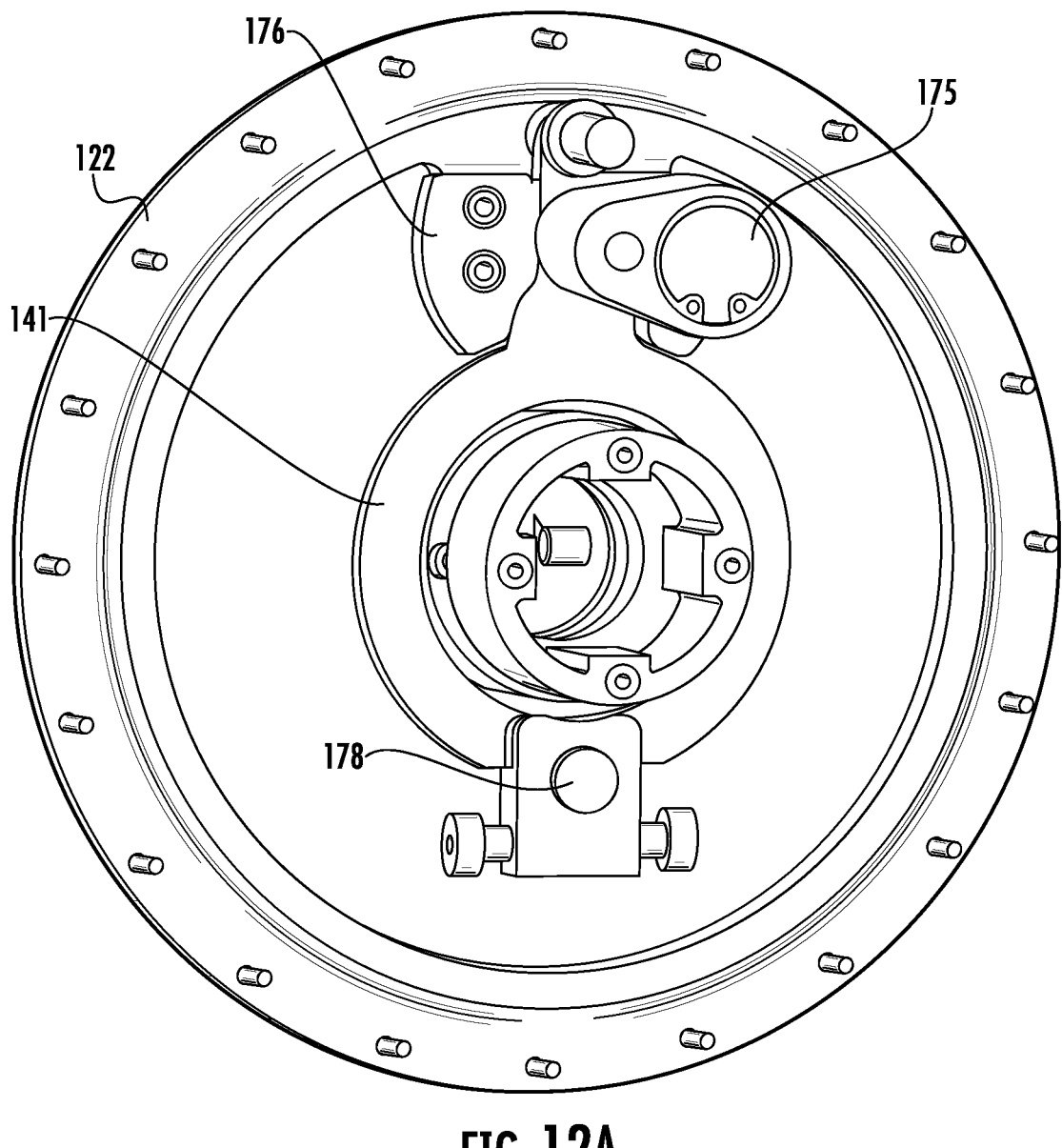
Figure 12B:
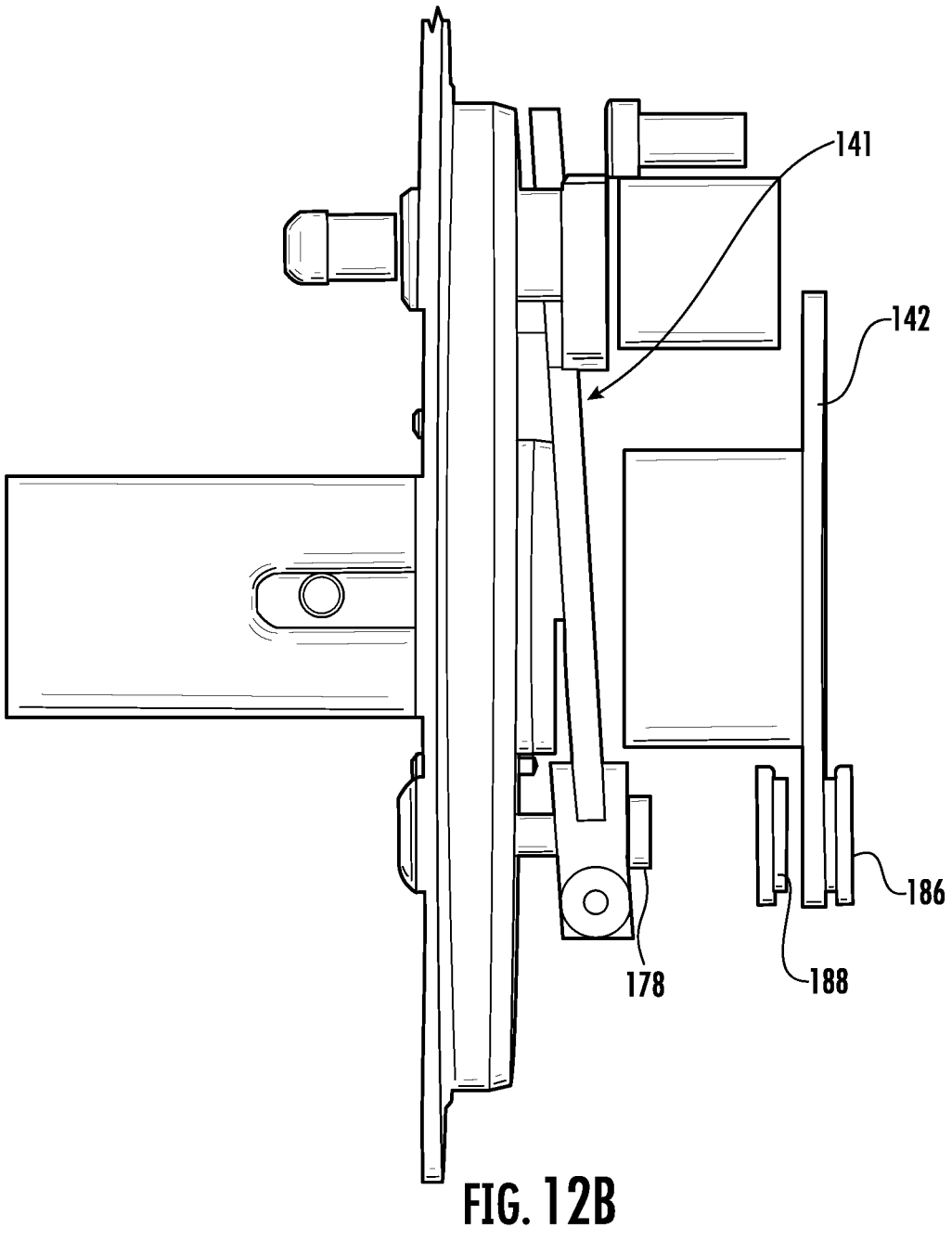
Figure 12C:
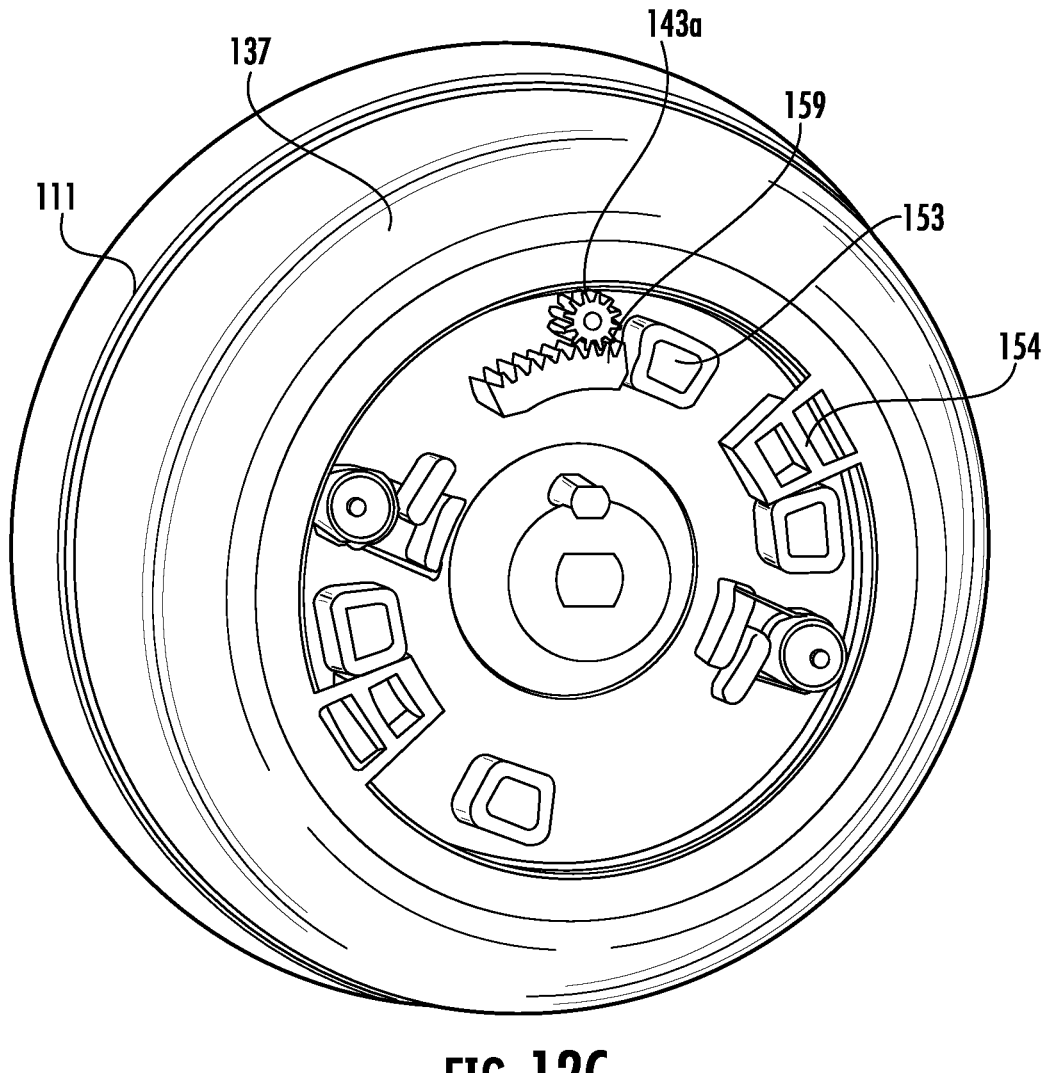
Figure 13:
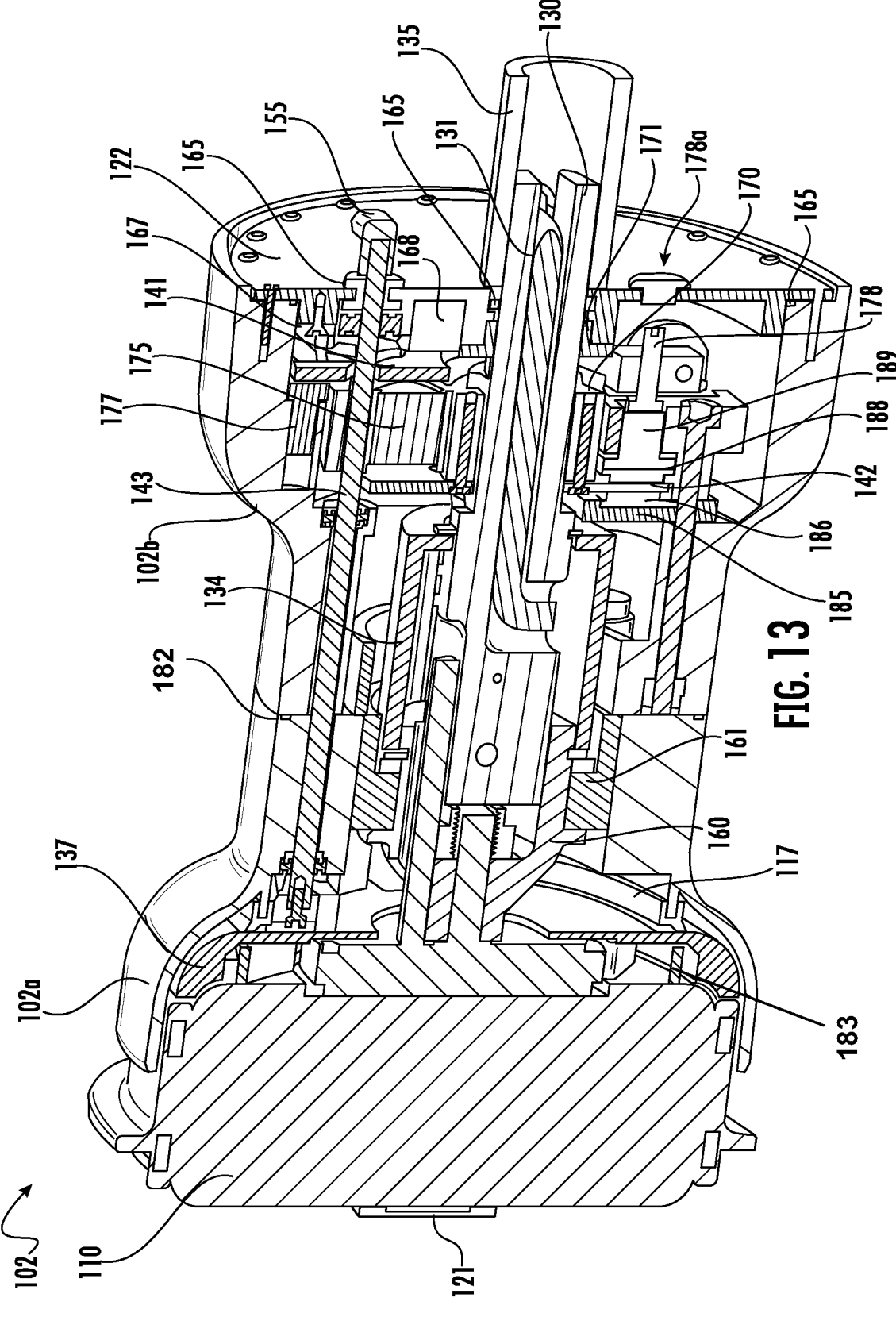

Having thus described the invention in general terms, reference will now be made to the accompanying drawings, which are not necessarily drawn to scale, and wherein:

FIGS. 1A-B illustrate perspective views of an example motorized wheel assembly, in accordance with some embodiments discussed herein;

FIG. 2 illustrates a side view of the motorized hub assembly, in accordance with some embodiments discussed herein;

FIG. 3A illustrates an exploded view of the motorized hub assembly shown in FIG. 2, in accordance with some embodiments discussed herein;

FIG. 3B illustrates a side view of contents of the motorized hub assembly shown in FIG. 2, in accordance with some embodiments discussed herein;

FIG. 4A illustrates a perspective view of the motor connection to the shaft and the connection wires, in accordance with some embodiments discussed herein;

FIG. 4B illustrates a perspective view of a motor seal plate prior to connection with the motor, in accordance with some embodiments discussed herein;

FIG. 4C illustrates a perspective view of the motor seal plate attached to the motor, in accordance with some embodiments discussed herein;

FIG. 5A illustrates a perspective view of the shaft attached to the motor, in accordance with some embodiments discussed herein;

FIG. 5B illustrates a perspective view of an outer hub, in accordance with some embodiments discussed herein;

FIG. 5C illustrates a cross-sectional view of the outer hub interaction with the motor, in accordance with some embodiments discussed herein;

FIG. 6 illustrates a close-up perspective view of a portion of the hub assembly, in accordance with some embodiments discussed herein;

FIG. 7A illustrates a perspective view of the inner hub, illustrating portions of an in-hub brake system, in accordance with some embodiments discussed herein;

FIG. 7B illustrates a perspective view of the inner hub illustrating portions of the in-hub brake system, in accordance with some embodiments discussed herein;

FIG. 8A illustrates a perspective view of the inner hub illustrating portions of the in-hub brake system, in accordance with some embodiments discussed herein;

FIG. 8B illustrates a cross-sectional view of a portion of the in-hub brake system, in accordance with some embodiments discussed herein;

FIG. 8C illustrates a perspective view of the inner hub, and the in-hub brake system, in accordance with some embodiments discussed herein;

FIG. 8D illustrates a perspective view of a portion of the brake pad system, in accordance with some embodiments discussed herein;

FIG. 8E illustrates a cross-sectional view of the portion of the brake pad system shown in FIG. 8D, taken along line 8E, in accordance with some embodiments discussed herein;

FIG. 9A illustrates a close-up perspective view of the inner hub and the in-hub brake system, in accordance with some embodiments discussed herein;

FIG. 9B illustrates a close-up perspective view of the inner hub and the in-hub brake system, in accordance with some embodiments discussed herein;

FIG. 9C illustrates a perspective cross sectional view of the inner hub and the in-hub brake system, in accordance with some embodiments discussed herein;

FIG. 10A illustrates a perspective view of a portion of the in-hub brake system disposed adjacent the sealing plate, in accordance with some embodiments discussed herein;

FIG. 10B illustrates a cross-sectional view of the portion of the in-hub brake system illustrated in FIG. 10A taken along line 10B, in accordance with some embodiments discussed herein;

FIG. 10C illustrates a perspective view of the sealing plate opposite the in-hub brake system, in accordance with some embodiments discussed herein;

FIG. 11A illustrates a perspective view of the in-hub brake system disposed adjacent the sealing plate, where the brake system is engaged, in accordance with some embodiments discussed herein;

FIG. 11B illustrates a side view of the in-hub brake system disposed adjacent the sealing plate, where the brake system is engaged, in accordance with some embodiments discussed herein;

FIG. 11C illustrates a perspective view of the configuration of the motor seal plate, where the brake system is engaged, in accordance with some embodiments discussed herein;

FIG. 12A illustrates a perspective view of the in-hub brake system disposed adjacent the sealing plate, where the brake system is disengaged, in accordance with some embodiments discussed herein;

FIG. 12B illustrates a side view of the in-hub brake system disposed adjacent the sealing plate, where the brake system is disengaged, in accordance with some embodiments discussed herein;

FIG. 12C illustrates a perspective view of the configuration of the motor seal plate, where the brake system is disengaged, in accordance with some embodiments discussed herein; and FIG. 13 illustrates a cross-sectional view of the motorized hub assembly, shown in FIG. 2, taken along line 13, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

Wheel assemblies are used on devices to aid in the transportation of the device. Many different types of transportation utilize different wheel assemblies. Wheel assemblies are largely customizable in type and size of tire, motor position, motor support, brake configuration, etc. In this regard, different wheel assemblies may be configured for different activities, such as bicycling, driving, pushing a wheelbarrow, pulling a wagon, etc. In general, different wheel assemblies may be configured specifically to accommodate the type of activity, motor configuration, terrain, or similar need. Example embodiments of the present invention relate to wheel assemblies configured for attachment to multiple types of devices.

FIGS. 1A-B illustrate perspective views of an example motorized wheel assembly 100. The wheel assembly 100 comprises a tire 101 disposed about a hub 120. The hub assembly 120 may be configured to support and rotate with the tire 101. In some embodiments, the hub assembly 120 may be sealed on one end via a sealing plate 122 and a hub cap 121 may be positioned (e.g., glued) on the hub assembly 120 opposite the sealing plate 122. In some embodiments, a shaft attachment 135 may be positioned about a shaft (see e.g., 130 FIG. 3A) extending thought the sealing plate 122. In this regard the wheel assembly 100 may be configured to be attached to any axle with the shaft attachment feature 135. In this regard, example wheel assemblies of the present invention may be swappable with non-motorized wheel assemblies. Similarly, the wheel assembly 100 may be removed from an axle for easy storage. In some embodiments, a manual brake release 155 may be positioned through the sealing plate 122, such that a user may rotate the manual brake release 155 to manually release the brake system (e.g., 156 and 173 FIG. 3B) within the hub 120.

In some embodiments, the tire 101 may be a balloon tire. In this regard, the tire 101 may be a low-pressure wheel configured for all terrain. In some embodiments, the tire 101 may be configured for traversing over sand and/or mud or other soft terrain, for example, at a beach. Additionally or alternatively, the tire 101 may be configured to traverse over rocky and/or uneven terrain, for example, while on a trail.

FIG. 2 illustrates a side view of a hub assembly 102 (e.g., the wheel assembly 100 without the tire 101). In some embodiments, the hub assembly 102 may comprise a hub including a first hub portion 120a and a second hub portion 120b, wherein the first hub portion 120a and the second hub portion 102b are connectable and form a watertight seal. In some embodiments, a motor 110 may be attached to the first hub portion 120a. The motor 110 may be in mechanical connection with the manual break release 155 configured to manually unlock the brake system, as discussed herein. In some embodiments, the shaft (e.g., 130 FIG. 3A) may extend through the hub assembly 102 between the motor 110 and the shaft attachment 135. In some embodiments, the hub assembly 120 may be configured to rotate about the shaft 130. In this regard, the components in mechanical connection with the either the first hub portion 120a or the second hub portion 102b may also rotate about the shaft 130. Further, any components in mechanical communication with the hub assembly 120 may be configured to rotate with the hub assembly 120 about the shaft 130.

As will be discussed further herein, the hub assembly 102 may further comprise connection wires 131 extending from the motor 101 through the hub 102. In some embodiments, the connection wires 131 may extend external to the sealing plate (e.g., 122 FIG. 1A) for connection at a connection interface. In some embodiments, the connection interface may enable connection to at least one power source, for example a battery. The battery may, thus, be mounted within or to the transportation device (e.g., cart, wheelchair, push cart, buggy, etc.). The connection interface may also comprise connection to a user input device (e.g., throttle, joystick, etc.) configured to control motorized movement of the wheel assembly 100 (e.g., operating the motor in forward or reverse, braking the motor, directing the wheel assembly, etc.).

FIGS. 3A-B illustrate various components within the hub assembly 102, and the structure thereof. Specifically, FIG. 3A illustrates an exploded view of the components, and FIG. 3B illustrates a side view of the hub assembly 102 without the hub 102. These views provide the general structure of the hub assembly 102 which will be described in more detail with reference to other figures herein. In some embodiments, the brake system may comprise a biasing system 173 (FIG. 3B), and a brake pad system 156. The brake system may be engaged by default and may disengage when acted on by a force, for example the motor 110 or the manual brake release 155. In some embodiments, a brake shaft 143 may translate the brake system status (e.g., engaged or disengaged) between the motor 110 and the brake system.

In some embodiments, the motor 110 may be disposed on an outer end of the hub assembly 102. The motor 110 may receive power from the connection wire 131 which may be connected to an external power source, for example a battery. In some embodiments, the power source may be mounted on a body of a device (e.g., a wheelchair, a pushcart, a buggy, etc.). In some embodiments, the connection wire 131 may be connected to a connection wire terminal 133 which connects the connection wire 131 to motor wires to provide electrical communication between the external power source and the motor 110. In this regard, in some embodiments the motor 110 may receive power and communication signals from different sources (e.g., a power source, and a communication signal source), while in other embodiments the motor 110 may receive power and communication signals from the same source (e.g., the user input device). With reference to FIGS. 4A-B, the motor 110 comprises a rotor 111 and a stator 112. In some embodiments, the rotor 111 is configured to rotate about the stationary stator 112. In this regard, any components in contact with only the rotor 111 may be configured to rotate, while components in contact with only the stator 112 may be stationary.

In some embodiments, with reference to FIGS. 4A-5C, the shaft 130 may be connected to the stator 112 by a stator protrusion 113, a shaft support 160 and a pin. To explain, with reference to FIG. 5A, the shaft support 160 may be positioned around the stator support 113 and the connection wires 131. In some embodiments, the shaft support 160 may be at least partly conical. In this regard, the side connecting to the stator protrusion 113 may be smaller than the side connecting to the shaft 130. In some embodiments, the stator protrusion 113 may have at least one flat surface such that the shaft support 160 may engage the stator protrusion 113 and not rotate about the stator protrusion 113. The shaft support 160 may be secured to the stator protrusion with a nut or similar fastening means. In some embodiments, the shaft 130 may be positioned in the shaft support 160 and fastened to the shaft support 160 with a fastener 160a. In this regard, the shaft 130 may be stationary in comparison to the rotor 111. In some embodiments, the shaft 130 may define a solid body, while in other embodiments, the shaft 130 may be at least partially hollow. In this regard, various types of connection between the shaft 130 and the motor 110 are contemplated.

In some embodiments, the connection wire 131 may be connected to the stator 112 adjacent to the stator protrusion 113 and the shaft 130. In some embodiments, the connection wire 131 may be positioned through the shaft support 160 and may be secured adjacent to the shaft 130 within the shaft support 160. In this regard, in some embodiments, the connection wire 131 may run parallel to the shaft 130 while being external thereto. In other embodiments, the connection wire 131 may extend through the shaft 130, and the connection wire terminal 133 may be positioned on the shaft 130. In this regard, both the connection wire 131 and the connection wire terminal 133 may be stationary as each are attached to the shaft 130.

In some embodiments, the rotor 111 may comprise at least one rotor protrusion 115. As depicted in FIG. 4A, the at least one rotor protrusion 115 may be more than one protrusion. In such embodiments, the more than one rotor protrusions 115 may be, for example, evenly spaced about the rotor 111 (although other spacing is contemplated).

In some embodiments, the motor 110 may comprise motor vanes 116 along the rotor 111. The motor vanes 116 may extend radially between the stator 112 and a seal 165. In some embodiments, the seal 165 may be formed as a part of the rotor 111, while in other embodiments the seal 165 may be attached (e.g., adhered) to the rotor 111. In some embodiments, the seal 165 may provide a watertight seal between the rotor 111 and another component to waterproof the motor 110 of hub assembly 102.

In some embodiments, with reference to FIGS. 4A-C, a motor seal plate 137 may be positioned about the seal 165 and may engage with the at least one rotor protrusion 115. In some embodiments, a binder may be used to secure the motor seal plate 137 to the seal 165. In some embodiments, the binder may be cured by room temperature vulcanization (RTV). In this regard moisture from the atmosphere may be required to cure the binder. In some embodiments, the motor seal plate 137 may be secured to the seal 165, thereby waterproofing the motor 110 component of the hub assembly 102.

In some embodiments, with reference to FIG. 4B, the motor seal plate 137 may comprise cut outs 137a disposed about the perimeter. In this regard, each of the cut outs 137a may correspond to and be positioned on the at least one rotor protrusion 115. In this regard, the engagement between the cut outs 137a and the at least one rotor protrusion 115 may maintain the placement and positioning of the motor seal plate 137 on the motor 110. In some embodiments, the motor seal plate 137 may be aluminum or stainless steel.

In some embodiments, the motor seal plate 137 may comprise a polished area 137b. In some embodiments, the polished area 137b may form a lip seal with the hub assembly 120 thereby preventing water ingress into the motor 110.

In some embodiments, the motor seal plate 137 may comprise features which interact with the hub 120, and components of the brake system. In some embodiments, the motor seal plate 137 may comprise at least one torque transfer feature 153. In some embodiments, the torque transfer features 153 may be evenly spaced about the motor seal plate 137, while in other embodiments the torque transfer features 153 may be patterned about the motor seal plate 137, but not necessarily evenly spaced. In some embodiments, there may be four torque transfer features. In some embodiments, the first and second torque transfer features may be 20 degrees apart, the second and third torque transfer features may be spaced 160 degrees apart, the third and fourth torque transfer features may be spaced 20 degrees apart, and the fourth and first torque transfer features may be spaced 160 degrees apart. Thus, the spacing between the first and second torque transfer feature, and the third and fourth torque transfer features may provide the hub with, for example, 10-degree rotation in relation to the motor 110, which as discussed herein translates to a 90-degree rotation of the brake system, specifically the magnet system (e.g., 173 FIG. 3B). In this regard, as will be discussed herein, a torque transfer block 154 of the hub assembly 120 may be positioned between the first and second torque transfer feature, and between the third and fourth torque transfer features, such that the torque transfer block 154 of the hub may rotate 10 degrees (e.g., positive and negative) between the torque transfer features 153 to engage or disengage the brake system.

With reference to FIG. 4C, in some embodiments, a bumper 153a may be positioned around each of the torque transfer features 153. The bumper 153a may be a rubber material to provide soft interactions, and quiet operations of the motor.

In some embodiments, the motor seal plate 137 may comprise a gear section 159. In some embodiments, the gear section 159 may abut one of the torque transfers features 153. The gear section 159 may provide a mechanical connection point between the brake shaft (see e.g., 143 FIG. 2) and the motor (see e.g., 110 FIG. 2) to transition the brake system (and/or components thereof, such as the actuator plate 141) from an engaged position to a disengaged position.

The motor seal plate 137 may further comprise at least one torsion spring mounting feature 158. In some embodiments, the motor seal plate 137 may comprise two torsion spring mounting features 158 diametrically opposed. In this regard, a first torsion spring mounting feature 158 may be positioned between the gear section 159 and a torque transfer feature 153, while a second torsion spring mounting feature 158 may be positioned between two torque transfer features 158. In some embodiments, the torsion spring mounting feature 158 may comprise a mount 158b and a grove feature 158a. A torsion spring 139 may be positioned on the torsion spring mount 158 such that a body of the torsion spring 139 is positioned on the mount 158b, and legs 139a of the torsion spring 139 are secured in the groove feature 158a.

The torsion spring 139, in some embodiments, may be a coil spring, while in other embodiments the torsion spring may be a leaf springs. As discussed, there is a 10-degree relative movement between the hub and the motor, such that the motor can switch the brake off without transferring torque. When the brake system is in the engaged position the torsion spring 158 is at a neutral position where there are no opposite forces on the spring legs 139a, however, when the brake system is disengaged one of the legs 139a is shifted from the groove feature 158 to account for the relative movement between the hub and the motor 110.

FIGS. 5A-C illustrate the first hub portion of the wheel assembly. FIG. 5A illustrates the motor 110, shaft 130 and motor seal plate 137, FIG. 5B illustrates the first hub 120a and features thereof, and FIG. 5C illustrates a cross sectional of the first hub 120a portion when the first hub is engaged with the motor.

In some embodiments, the first hub portion 120a may define a changing diameter from an outer edge 191 to an inner edge 192. In this regard, the diameter of the outer edge 191 may be larger than the diameter of the inner edge 192. In some embodiments, the outer edge 191 of the first hub portion 120a may be configured to be connected to the motor (e.g., 110 FIG. 2). In some embodiments, the outer edge 191 diameter may be larger than a motor diameter such that the motor 110 may be recessed within the first hub portion 120a. In some embodiments, the first hub portion 120a may comprise a rib 193. The rib 193 may be molded into the hub 120a. In some embodiments, a lip seal 117 may be positioned over the rib 193. The lip seal 117 may be formed of rubber or similar substrate. In some embodiments, the lip seal 117 may correspond to, and be sealed to the polished surface 137b of the motor seal plate 137 providing waterproofing of the hub assembly. The first hub portion 120a may comprise at least one motor o-ring 183 configured to provide a watertight seal between the first hub portion 120a and the motor (e.g., 110 FIG. 2).

In some embodiments, the first hub portion 120a may comprise one or more torque transfer blocks 154 diametrically opposed. As discussed, the torque transfer blocks 154, when the first hub portion 120a is engaged with the motor seal plate 137, may be positioned between the torsion torque features 153. In this regard, the first hub portion 120a may be configured to rotate about the shaft 130 wherein the degree of rotation is bound by the torque transfer features 153. To explain, the torque transfer blocks 154 are configured to be movable between adjacent torque transfer features 153. Thus, the rotation between the motor and the first hub portion 120a is limited to the size of the space between adjacent torque transfer features 153 on the motor seal plate 137. Therefore, as will be discussed further herein, as a 90 degree rotation of the brake shaft 143 corresponds to a 10 degree rotation of the motor seal plate 137, the torque transfer features 153 may be 20 degrees apart, such that the brake shaft may be rotated 90 degrees either clockwise, or counter clockwise from a neutral position (e.g., where the brake system is engaged). In other embodiments, a 90 degree rotation of the brake shaft 143 may correspond to a 3 degree rotation, a 5 degree rotation, an 8 degree rotation of even, in some embodiments greater than a 10 degree rotation.

In some embodiments, the brake shaft 143 may be positioned through a brake shaft column 123 within the first hub portion 120a. In some embodiments, the brake shaft 143 may be retained within the first hub portion 120a within one or more fasteners. Additionally, the brake shaft 143 may include a gear pinion 143a positioned on an end of the brake shaft 143. In some embodiments, the gear pinion 143a may also fix the brake shaft 143 within the brake shaft column 123. In this regard, the gear pinion 143a may define a diameter greater than the diameter of the brake shaft column 123, therefore once the gear pinion 143a is secured to the brake shaft 143 (e.g., by a screw or similar fastener) the brake shaft cannot recced through the brake shaft column 123. In some embodiments, the brake shaft column 123 may be a point of contact between the in-hub brake system, including a brake pad system 156 and a biasing system 173, and the hub 120.

The first hub portion 120a may further include openings to receive blade features 138. In some embodiments, the blade features 138, when the first hub portion 120a is engaged with the motor seal plate 137, may be positioned between the legs 139a of the torsion spring 139. In some embodiments, the blade features 138 are configured to move one of the spring legs 139a per torsion spring 139 up to 10 degrees off of the groove feature 158a. In this regard, the force of transitioning the brake biasing system 173 from an engaged position to a disengaged position causes the hub assembly 120 to rotate which in turn causes the blade feature 138, which is engaged with the spring legs 139a to move one of the legs 139a. The force is maintained by the motor when the motor is rotating and the brake system is disengaged. However, once the motor stops rotating the spring legs 139a may provide a great enough force to cause the hub to rotate, in turn activating the brake system.

In some embodiments, the first hub portion 120a may comprise a plurality of connector channels 125. In some embodiments, the connector channels 125 may extend between the first hub portion 120a and the second hub portion (e.g., 120b FIG. 3A). The connector channels 125 may be configured to receive a fastener 127, for example a screw or similar to secure the first hub portion 120a to the second hub portion 120b. In some embodiments, the fastener 127 may be a hex bolt or similar bolt. In some embodiments, the nut 126 may be a washer. In some embodiments, there may be at least two connector channels 125, while in other embodiments there may be at least 6 connector channels 125. In embodiments providing more than one connector channel 125, the connector channels 125 may be evenly spaced within the hub 120.

In some embodiments, a first bush 161 may be positioned within the first hub portion 120a. In some embodiments, the first bush 161 may be secured within the first hub portion 120a with the slots for receiving the blade features 183. In some embodiments, the first bush 161 may secured into the first hub 120a with a screw or similar fastening device. The first bush 161 may rotate over the shaft support 160. The first hub portion 120a may further include a retaining ring 163 to keep the first bush 161 in place within the first hub portion 120a. In some embodiments, a circlip may be further positioned over the retaining ring 163 to secure the first hub portion 120a and motor 110 into a single piece.

FIG. 6 illustrates a perspective view of the hub assembly 102 with the first hub portion 120a assembled. In some embodiments, shaft 130 may comprise a connection wire terminal 133 which provides electrical communication between the motor 110 and an external power source, and other controllers. In some embodiments, a cable sleeve 134 may be positioned around the shaft 130, and the connection wire terminal 133 to protect the connections during operation of the wheel assembly 100.

Turning to FIGS. 7A-B, illustrating a portion of the brake pad system (e.g., 156 FIG. 3B), in some embodiments, the brake pad system may be positioned within the second hub portion 102b. In some embodiments, the second hub portion 102b may be configured with similar characteristics to the first hub 120a. In some embodiments, the second hub portion 102b may define a symmetrical outer profile to the first hub portion 102a between the inner edge and the outer edge. In some embodiments, the second hub 120b may comprise a larger number of connector channels than the first hub 120a. In this regard, the first connector channels 125a may correspond to the connector channels 125 of the first hub 120a. The first connector channels 125a may align with the connector channels 125 to secure the first hub portion 120a and the second hub portion 120b together, via connector channel fasteners 127.

In some embodiments, the second hub portion 120b may comprise upper brake pad channels 125b, and a lower brake pad channel 125c. The upper brake pad channels 125b and the lower brake pad channel 125c may be positioned between the first channels 125a, and may be configured to secure a fixed brake pad mount 185 to the second hub portion 120b. In some embodiments, the fixed brake pad mount 185 may be secured to the second hub portion 120b with a fastener 185a. In some embodiments, the fastener 185a may be a screw, bolt or other similar fastener. In some embodiments, the fixed brake pad mount 185 may be configured to secure a fixed brake pad 186. The fixed brake pad 186 and fixed brake pad mount 185 are configured to transfer the brake torque to the hub 120.

With reference to FIGS. 8A-E, a brake plate 142 may be positioned adjacent the fixed brake pad 186 and fixed brake pad holder 185. In some embodiments, the brake plate 142 may extend circumferentially around the shaft 130, and may be stationary about the shaft 130. In some embodiments, the brake plate 142 may be attached to an inner boss 170. In some embodiments, the inner boss 170 may be keyed to the shaft 130 such as to prevent rotation about the shaft, however the inner boss 170 may slide axially along the shaft 130. In this regard, the inner boss 170 may be designed to receive radial loads.

A sliding brake pad mount 187 may be positioned adjacent the brake plate 142 on an opposite face as the fixed brake pad mount 185. In some embodiments, the sliding brake pad mount 187 may be attached to the fixed brake pad mount 185 with a fastener 127. The sliding brake pad mount 187 may be configured to move in relation to the brake plate 142. The sliding brake pad mount 187 may include a sliding brake pad 188 positioned on a sliding mount 189. The sliding mount 189 is configured to move perpendicular to the brake plate 142, such that, when the brake system is engaged, the fixed brake pad 186 and the sliding brake pad 188 sandwich the brake plate 142 to engage the brake and cease the rotation of the hub system 120. In some embodiments, the sliding brake pad mount 187 may comprise an attachment point to secure the actuator plate as will be discussed herein.

FIGS. 9A-C illustrate a biasing system 173 within the brake system. In some embodiments, the biasing system 173 may be a magnet system, a spring system, or similar system being moveable between a first position and a second position. In some embodiments, the biasing system 173 may include a magnet holder 174 extending from and locked to (e.g., rotatable with) the brake shaft 143. Thus, as the brake shaft 143 rotates the magnet holder 174 rotates in the same degree from a first position to a second position. The magnet holder 174 may be positioned adjacent to but not in contact with the brake plate 143. In some embodiments, a dampener 177 may be positioned above the brake shaft 143 in line with the magnet holder 174. The dampener 177 may be an elastic material, for example rubber, to soften the movement of the actuator plate 141, in transition from the engaged position to the dis The magnet holder 174 retains a magnet 175 which is configured to engage with an actuator plate 141. The actuator plate 141 extends between the brake shaft 143 and the sliding brake pad mount 187. Further, the actuator plate 141 extends around the shaft 130. In some embodiments, the actuator plate 141 may be formed of a magnetic metal. In this regard, the actuator plate 141 may be attracted to and retained by the magnet 175 when the magnet 175 is in the first position and providing a magnetic force to the actuator plate 141 (which thereby acts as a first biasing force to hold the actuator plate 141 in the engaged position). The actuator plate 141 may be configured for movement relative to the brake shaft 141 and the shaft 130 (e.g., movement along and/or rotate (e.g., tilting) relative thereto). To explain, the actuator plate 141 may be retained in the sliding brake pad mount 187 by a holder 190. The holder 190 may function as a rotation point for the actuator plate 141, more specifically for the pivot plate 179. In some embodiments, a screw 178 may be fixed within the pivot plate 179, and may be in mechanical communication with the sliding mount 189.

In this regard, as the actuator plate 141 rotates about the pivot plate 179 the position of the screw 178 moves, in turn causing movement of the sliding mount 189, and therefore the sliding brake pad 188. In this regard, the contact opening between the actuator plate and the brake shaft 143 may provide a large enough opening so the actuator plate 141 may move axially along the brake shaft 143.

FIG. 10A-C illustrate components of the hub system, and the biasing system 173 components on the sealing plate 122. In some embodiments, the sealing plate 122 may be configured to fit within the outer edge (e.g., 191 FIG. 5B) at a sealing plate position along the shaft 120. In some embodiments, the sealing plate may comprise a shaft hole, a brake shaft hole, and a screw hole. In some embodiments, each of the shaft hole, brake shaft hole, and screw hole may be linearly aligned, and each may be sized to receive the respective feature. Each of the respective holes, as will be discussed herein, may comprise a sealing fitting, for example an o ring, or plug. In some embodiments, the sealing plate 122 may be configured to rotate with the hub assembly 102.

In some embodiments, an inner bush 171 may be positioned within the sealing plate 122 such as to provide rotation of the sealing plate 122 about the shaft 130, specifically the inner boss 170. As discussed, since the inner bush 171 is fixed within the sealing plate 122, the inner boss 170 may only receive radial loads, where in comparison the shaft support 160, which is configured as a boss, is configured to received both radial and axial loads. In this regard, the load from the motor 110 is distributed within the hub, rather than requiring external support on both sides of the motor, for example as seen between the forks of a bicycle.

In some embodiments, the first bush 161 and the inner bush 171 may be formed of a thermoplastic. In some embodiments, a high strength, low friction thermoplastic may be used, for example, acetal, nylon or ultra-high molecular weight polyethylene (UHMWPE). In this regard, the first bush and inner bush 161, 171 may be stable across high temperatures, and be configured to endure physical and mechanical stresses, such as distributing and receiving the load from the wheel assembly. In some embodiments, the inner bush 171 and the first bush 161 may be identical (e.g., in shape, size and material). In this regard, each of the first bush 161 an the inner bush 171 may comprise at least one groove 171a configured to interact with the hub.

Returning to the figures, the sealing plate 122 may comprise magnetic plates 176 adjacent to the brake shaft opening. In some embodiments, the magnetic plates 176 may be steel, or a similar metal. The magnetic plates 176 may be configured to be used to transfer the magnetic field, from the magnet and the actuator plate 141, to the magnet 175 and the magnetic plates 176. In this regard, as there is a large magnetic field formed between the magnet 175 and the actuator plate 141 when the magnet 175 is removed from the actuator plate a force is required to move and overcome the magnetic field. However, positioning the magnetic plates 176 adjacent the actuator plate 141 (and misaligned therefrom), allows the magnetic field to transfer from the actuator plate 141 to one of the magnetic plates 176 thereby providing an easier transition between engagement of the brake and disengagement of the brake.

In some embodiments, the actuator plate 141 may be otherwise biased to the disengaged position, such as due to a biasing element (e.g., a spring, a magnet (such as a secondary magnet 167), or other element), or a natural bias of the material forming the actuator plate 141, or combinations thereof. In this regard, once the magnetic force from the magnet 175 is removed (e.g., the first biasing force is removed), the actuator plate 141 may transition to the disengaged position via a second biasing force. Notably, in such embodiments, the second biasing force may be less than the first biasing force such that there is still a bias for the actuator plate 141 to move to or stay in the engaged position (such as described herein).

In some embodiments a second pad 168 may be positioned below the magnetic plates 176. The second pad 168 may dampen the transition of the actuator plate 141 from the engaged position to the disengaged position. In some embodiments, a secondary magnet 167 may be positioned above the magnetic plates 176. The secondary magnet 167 may be configured to retain or partially retain the actuator plate in the disengaged position and/or provide the second biasing force (or a portion thereof).

In some embodiments, the sealing plate 122 may comprise an opening 178a covered by a seal, to provide access to the screw 178 for manual adjustment of the position of the screw 178, and therefore adjustment of the position of the sliding brake pad 188. This may provide a way for the user to tighten or loosen the brake force on the brake plate 142.

In some embodiments, the brake shaft 143 may be attached to the manual brake release 155, which is positioned on the exterior face of the sealing plate 122. In some embodiments, the manual brake release may be rotated, e.g., 90 degrees, from neutral to disengage the brake system. In this regard, to manually release the brake system, for example, for manual movement, the manual brake release 155 may be rotated to disengage the brake system and allow movement of the wheel assembly.

In some embodiments, each of the openings may comprise a sealing portion to prevent water ingress into the hub assembly 102. For example, a brake shaft seal 122b may be positioned within the brake shaft opening, and an o-ring 165 may be positioned within the shaft opening.

The brake assembly will be discussed further herein with reference to FIGS. 11A-12C. FIGS. 11A-C illustrate various views of the brake system components when the brake system is engaged, while FIGS. 12A-C illustrate reciprocal views of the brake system components when the brake system is disengaged.

In the engaged position, the biasing system is aligned in a neutral position (e.g., a first position). In this regard, in some embodiments, the default position of the brake system is to have the brake system engaged, thereby preventing rotation of the wheel assembly. In the engaged, or neutral position, the magnet 175 is in magnetic connection with the actuator plate 141. In the engaged position, the actuator plate 141 extends parallel to the sealing plate 122 and the brake plate 142. In this position, the screw 178 engages the sliding brake pad mount, specifically the sliding mount (see e.g., 189 FIG. 8D) such that the sliding brake pad 188 and the fixed brake pad 186 sandwich the brake plate 142. In this regard, the force of the sliding brake pad 188 and the fixed brake pad 186 on the brake plate 142 prevent rotation of the brake plate 142.

FIG. 11C illustrates the motor seal plate 137 and a portion of the first hub portion 120a in the engaged, or neutral position. In the engaged position the torque transfer block 154 is positioned between two adjacent torque transfer features. Additionally, the gear pinion 143a (of the brake shaft 143) is in the center of the gear section 159. In this regard, the hub assembly 120 can rotate either clockwise or counterclockwise from the neutral position to disengage the brake system.

In the neutral position, the torsion springs 139 are in a neutral position. In this regard, the blade feature (e.g., 138 FIG. 5B) is centered between the legs 139a of the torsion springs 139.

When the brake system is in the disengaged position the hub assembly may rotate about the shaft 130. In the disengaged position the magnet 175 is engaged with one of the magnetic plates 176 positioned on the sealing plate 122. As the magnet 175 is no longer in magnetic communication with the actuator plate 141, the actuator plate 141 may move along the brake shaft by rotating about the pivot plate 179. As the screw 178 is engaged with the pivot plate 179 the screw 178 may remove a portion of the force from the sliding brake mount, and therefore the sliding brake pad 188, thereby relieving the force between the sliding brake pad 188 and the fixed brake pad 186 on the brake plate 142.

Additionally, as the brake shaft rotates to facilitate the magnet 175 engagement from the actuator plate 141 to the magnetic plates 176, the gear pinion 143a rotates along the gear block 159. After the rotation, the torque transfer block 154 abuts one of the torque transfer features 153. In the rotation of the hub assembly, the tension is applied on to the torsion springs 139 by the blade features 138. To explain, in the neutral position, or where the brake system is engaged the legs of the torsion springs 139 abut the blade feature 138 and the groove features 158a. However, when the brake system is disengaged, the blade feature 138 causes one of the legs of each of the torsion spring 139 to move away from the groove feature 158a thereby causing tension within the spring. Although the magnet force between the magnet 174 and the magnetic plates 176 may be strong enough to maintain the tension within the torsion spring 139 during rotation. In some embodiments, when the motor 110 ceases rotation, the tension within the spring may aid in returning the hub assembly to the neutral position. This causes the gear pinion 143a to return to the neutral position and the magnet 175 to return to the first position to bias the actuator plate 141 to the engaged position to cause the brake system to prevent rotation of the hub and tire. In this regard, the biasing system is configured to prevent rotation of the hub and the tire in event of at least either (i) loss of power to the motor or (ii) ceasing operation of the motor.

Thus, in the transition from the disengaged position, where the hub assembly freely rotates with the rotor about the shaft and the stator, to the engaged position, the tension from the blade feature 138 on the torsion spring 139 may decrease such that the force exerted by the hub through the blade feature may be less than the tension within the torsion spring. The tension within the torsion spring legs may encourage the hub to shift back to the neutral position.

FIG. 13 illustrates a cross-sectional view of the hub assembly 102 taken across line 13 shown in FIG. 2. Between each of the first hub portion 120a and the second hub portion 120b, the hub o-ring 182 may be positioned to provide a watertight seal. In this regard, the hub o-ring 182 may fill the groove between the first hub portion 120a and the second hub portion 120b to prevent water, and other dust and/or debris from entering into the body of the hub 120.

As discussed above, the motor o-ring 183 may be positioned between the first hub portion 120a and the rotor 111 of the motor 110. In this regard the connection between the hub assembly 120 and the motor 110 may be waterproofed and may prevent dust and/or other debris from entering into the hub body, and between the rotor 111 and the stator 112. As discussed herein, other o-rings, and/or seals may be used between components of the hub assembly 102 to waterproof the assembly.

In some embodiments, the hub assembly 102 may be fully waterproofed. In some embodiments, the hub assembly may be waterproofed up to at least IPX6 (e.g., IPX6, IPX7, IPX8, or other waterproof standards similarly recognized (or future developed) regarding IPX6). In this regard the hub assembly 102 may be protected from high-pressure water streams from any angle. Thus, the wheel assembly 100 as described herein may be used in wet environments, without ruining the components thereof.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed:

1. A motorized wheel assembly comprising:
   an in-hub motor comprising at least a rotor;
   a shaft defining a first end and a second end, wherein the shaft extends at least partially about the in-hub motor;
   a hub disposed about and not in direct contact with the shaft;
   a torque transfer feature configured to supply mechanical engagement between the rotor and the hub such that the hub rotates with the rotor;
   at least one connection wire extending from the motor to a connection wire interface, wherein the at least one connection wire is configured to supply power to the motor from an external power source, wherein the at least one connection wire is stationary; and
   a tire disposed about the hub.

2. The motorized wheel assembly of claim 1, wherein the second end of the shaft extends beyond an outer edge of the hub, and wherein the second end of the shaft is configured to receive a shaft attachment.

3. The motorized wheel assembly of claim 2, wherein the shaft attachment is configured to attach to any axle.

4. The motorized wheel assembly of claim 1, wherein the connection wire interface is external to the hub and wherein the connection wire extends external to the hub such that a shaft attachment is attachable to any axle of a moveable device with the connection wire interface being external to such attachment.

5. The motorized wheel assembly of claim 1, further comprising a connection wire terminal disposed on the motor, wherein the at least one connection wire terminal provides electrical communication between the in-hub motor and the at least one connection wire.

6. The motorized wheel assembly of claim 1, wherein the motorized wheel assembly is waterproof.

7. The motorized wheel assembly of claim 1, wherein the motorized wheel assembly is waterproof to IPX6.

8. The motorized wheel assembly of claim 1, wherein the tire is a balloon wheel.

9. The motorized wheel assembly of claim 1, wherein the tire is an all-terrain tire.

10. A motorized hub assembly comprising:

an in-hub motor comprising at least a rotor;

a shaft defining a first end and a second end, wherein the second end of the shaft is configured to receive a shaft attachment;

a hub disposed about and not in direct contact with the shaft;

a torque transfer feature configured to supply mechanical engagement between the rotor and the hub such that the hub rotates with the rotor; and at least one connection wire extending from the motor to a connection wire interface, wherein the at least one connection wire is configured to supply power to the motor from an external power source, wherein the at least one connection wire is stationary.

11. The motorized hub assembly of claim 10, wherein the second end of the shaft extends beyond an outer edge of the hub.

12. The motorized hub assembly of claim 10, wherein the connection wire interface is external to the hub and wherein the connection wire extends external to the hub such that a shaft attachment is attachable to an axle of a moveable device with the connection wire interface being external to such attachment.

13. The motorized hub assembly of claim 10, further comprising a connection wire terminal disposed on the motor, wherein the at least one connection wire terminal provides electrical communication between the in-hub motor and the at least one connection wire.

14. The motorized hub assembly of claim 10, wherein the motorized hub assembly is waterproof.

15. The motorized hub assembly of claim 10, wherein the at least one connection wire is configured to supply communication signals to the motor from an external communication source.

16. A motorized wheel assembly comprising:

an in-hub motor comprising a stator and a rotor;

a shaft connected to the stator;

at least one connection wire extending from the in-hub motor, wherein the at least one connection wire is configured to supply power to the in-hub motor from an external power source;

a hub surrounding the motor forming a watertight seal, wherein the hub is attached to and configured to rotate with the rotor; and a wheel disposed about the hub.

17. The motorized wheel assembly of claim 16, wherein a second end of the shaft extends beyond an outer edge of the hub, and wherein the second end of the shaft is configured to receive a shaft attachment.

18. The motorized wheel assembly of claim 17, wherein the shaft attachment is configured to attach to any axle of a non-motorized movable device.

19. The motorized wheel assembly of claim 16, wherein the connection wire interface is external to the hub and wherein the connection wire extends external to the hub such that a shaft attachment is attachable to an axle of a moveable device with the connection wire interface being external to such attachment.

20. The motorized wheel assembly of claim 16, further comprising a connection wire terminal disposed on the motor, wherein the at least one connection wire terminal provides electrical communication between the in-hub motor and the at least one connection wire.

*     *     *     *     *